United States Patent
Buelow et al.

(10) Patent No.: US 8,372,477 B2
(45) Date of Patent: Feb. 12, 2013

(54) POLYMERIC TRAP WITH ADSORBENT

(75) Inventors: Mark T. Buelow, Phillipsburg, NJ (US);
Laif R. Alden, Feasterville, PA (US);
John Kauffman, Hazlet, NJ (US); John J. Steger, Pittstown, NJ (US); William McMaster, Berkeley Heights, NJ (US);
Zhenguo Liu, Flanders, NJ (US);
Raghuram Gummaraju, Kendall Park, NJ (US)

(73) Assignee: BASF Corporation, Florham Park, NJ (US)

( * ) Notice: Subject to any disclaimer, the term of this patent is extended or adjusted under 35 U.S.C. 154(b) by 344 days.

(21) Appl. No.: 12/793,586

(22) Filed: Jun. 3, 2010

(65) Prior Publication Data

US 2010/0316538 A1    Dec. 16, 2010

Related U.S. Application Data

(60) Provisional application No. 61/186,161, filed on Jun. 11, 2009.

(51) Int. Cl.
*B01D 53/04* (2006.01)
*F02M 25/08* (2006.01)

(52) U.S. Cl. ........... 427/181; 427/202; 96/154; 123/518

(58) Field of Classification Search ............... 96/108, 96/154; 95/146; 55/385.3; 123/518, 519; 427/180, 181, 202, 299

See application file for complete search history.

(56) References Cited

U.S. PATENT DOCUMENTS

| | | | |
|---|---|---|---|
| 3,639,280 A | 2/1972 | Lynch | |
| 3,727,597 A | 4/1973 | Hensler | |
| 3,838,673 A | 10/1974 | Csicsery | |
| 4,027,367 A | 6/1977 | Rondeau | |
| 4,099,943 A | 7/1978 | Fischman | |
| 4,261,716 A | 4/1981 | Dinsmore et al. | |
| 4,276,058 A | 6/1981 | Dinsmore | |
| 4,276,864 A | 7/1981 | Waschkuttis | |
| 4,289,513 A | 9/1981 | Brownhill | |
| 4,315,837 A | 2/1982 | Rourke | |
| 4,331,456 A | 5/1982 | Schwartz | |
| 4,338,101 A | 7/1982 | Tuttle | |
| 4,418,662 A | 12/1983 | Engler | |
| 4,711,009 A | 12/1987 | Cornelison | |
| 4,985,210 A | 1/1991 | Minami | |
| 5,051,244 A | 9/1991 | Dunne | |
| 5,094,218 A | 3/1992 | Everingham | |
| 5,125,231 A | 6/1992 | Patil | |
| 5,158,753 A | 10/1992 | Take | |
| 5,241,940 A | 9/1993 | Gates, Jr. | |

(Continued)

FOREIGN PATENT DOCUMENTS

| | | |
|---|---|---|
| CN | 1059701 | 3/1992 |
| CN | 101079489 | 11/2007 |

(Continued)

OTHER PUBLICATIONS

Heimrich, et al., "Cold-Start Hydrocarbon Collection for Advanced Exhaust Emission Control," Society of Automotive Engineers Publication No. 920847, Feb. 24-28, 1992.

(Continued)

*Primary Examiner* — Frank Lawrence, Jr.

(74) *Attorney, Agent, or Firm* — Melanie L. Brown

(57) ABSTRACT

A method of adhering a particulate material, such as a hydrocarbon adsorbent material and/or a catalytic material, to a plastic surface, and products comprising the adhered material are disclosed.

22 Claims, 4 Drawing Sheets

U.S. PATENT DOCUMENTS

| | | |
|---|---|---|
| 5,356,852 A | 10/1994 | DeLiso et al. |
| 5,432,214 A | 7/1995 | Lancesseur |
| 5,446,003 A | 8/1995 | Augustine |
| 5,585,192 A * | 12/1996 | Sharma et al. ............... 428/500 |
| 5,603,215 A | 2/1997 | Sung |
| 5,636,619 A | 6/1997 | Poola |
| 5,647,333 A | 7/1997 | Mukai |
| 5,955,393 A | 9/1999 | Moskovitz et al. |
| 6,074,973 A | 6/2000 | Lampert |
| 6,171,556 B1 | 1/2001 | Burk |
| 6,212,882 B1 | 4/2001 | Greger |
| 6,319,484 B1 | 11/2001 | Shore |
| 6,391,075 B1 | 5/2002 | Meiji |
| 6,408,815 B2 | 6/2002 | Karlsson |
| 6,416,562 B1 | 7/2002 | Shibuya |
| 6,432,179 B1 | 8/2002 | Lobovsky et al. |
| 6,438,486 B1 | 8/2002 | Mancini |
| 6,440,200 B1 | 8/2002 | Sakakibara |
| 6,464,761 B1 | 10/2002 | Bugli |
| 6,474,312 B1 | 11/2002 | Zulauf |
| 6,537,355 B2 | 3/2003 | Scardino |
| 6,540,815 B1 | 4/2003 | Hiltzik |
| 6,543,427 B2 | 4/2003 | Kawasaki |
| 6,592,655 B2 | 7/2003 | Iriyama |
| 6,637,193 B2 | 10/2003 | Oku |
| 6,637,415 B2 | 10/2003 | Yoshioka |
| 6,645,271 B2 | 11/2003 | Seguin |
| 6,673,136 B2 | 1/2004 | Gillingham |
| 6,692,551 B2 | 2/2004 | Wernholm |
| 6,692,554 B1 | 2/2004 | Leffel |
| 6,692,555 B2 | 2/2004 | Oda |
| 6,698,403 B2 | 3/2004 | Honda |
| 6,727,201 B2 | 4/2004 | Yamazaki |
| 6,736,115 B1 | 5/2004 | Leffel |
| 6,736,871 B1 | 5/2004 | Green |
| 6,780,534 B2 | 8/2004 | Stenersen |
| 6,783,881 B2 | 8/2004 | Stenersen |
| 6,786,199 B2 | 9/2004 | Oda |
| 6,792,749 B2 | 9/2004 | Ueno |
| 6,797,027 B2 | 9/2004 | Stenersen |
| 6,817,345 B2 | 11/2004 | Lawrence |
| 6,818,037 B2 | 11/2004 | Tanaka |
| 6,835,234 B2 | 12/2004 | Leffel |
| 6,863,984 B2 | 3/2005 | Hoke |
| 6,887,343 B2 | 5/2005 | Shukar |
| 6,905,536 B2 | 6/2005 | Wright |
| 6,939,396 B2 | 9/2005 | Petersson |
| 6,959,696 B2 | 11/2005 | Shears |
| 6,974,490 B2 | 12/2005 | Gillingham |
| 6,997,977 B2 | 2/2006 | Dallas |
| 7,001,445 B2 | 2/2006 | Petersson |
| 7,056,474 B2 | 6/2006 | Dumas |
| 7,160,361 B2 | 1/2007 | Meiller et al. |
| 7,163,574 B2 | 1/2007 | Bause et al. |
| 7,213,581 B2 | 5/2007 | Burke |
| 7,222,612 B2 | 5/2007 | Hagler |
| 7,261,093 B2 | 8/2007 | Groom |
| 7,278,410 B2 | 10/2007 | Hoke |
| 7,311,088 B1 | 12/2007 | Callahan et al. |
| 7,344,586 B2 | 3/2008 | Zulauf et al. |
| 7,360,530 B2 | 4/2008 | Oda |
| 7,377,966 B2 | 5/2008 | Smith et al. |
| 7,395,817 B2 | 7/2008 | Fujishiro |
| 7,422,628 B2 | 9/2008 | Foong |
| 7,438,952 B2 | 10/2008 | Connelly et al. |
| 7,458,366 B2 | 12/2008 | Luley et al. |
| 7,473,306 B2 | 1/2009 | Uemura |
| 7,531,029 B2 | 5/2009 | Hoke et al. |
| 7,540,904 B2 | 6/2009 | Hoke |
| 7,553,352 B2 | 6/2009 | Mueller et al. |
| 7,578,285 B2 | 8/2009 | Buelow |
| 7,677,226 B2 | 3/2010 | Buelow |
| 2002/0043156 A1 | 4/2002 | Shea |
| 2003/0166466 A1 | 9/2003 | Hoke |
| 2004/0050252 A1 | 3/2004 | Wernholm |
| 2004/0149129 A1 | 8/2004 | Petersson |
| 2004/0182240 A1 | 9/2004 | Bause |
| 2004/0211320 A1 | 10/2004 | Cain |
| 2004/0226440 A1 | 11/2004 | Foong et al. |
| 2004/0250680 A1 | 12/2004 | Wright |
| 2004/0255783 A1 | 12/2004 | Graham |
| 2004/0255911 A1 | 12/2004 | Abdolhosseini |
| 2005/0045160 A1 | 3/2005 | Peterson et al. |
| 2005/0081717 A1 | 4/2005 | Meiller |
| 2006/0105158 A1 | 5/2006 | Fritz et al. |
| 2006/0272508 A1 | 12/2006 | Hoke et al. |
| 2007/0104623 A1 | 5/2007 | Dettling |
| 2007/0107599 A1 | 5/2007 | Hoke et al. |
| 2007/0113831 A1 | 5/2007 | Hoke |
| 2007/0186904 A1 | 8/2007 | Braithwaite |
| 2007/0266997 A1 | 11/2007 | Clontz, Jr. |
| 2007/0278034 A1 | 12/2007 | Yamaura |
| 2008/0000455 A1 | 1/2008 | Treier |
| 2008/0041226 A1 | 2/2008 | Hiltzik |
| 2008/0120019 A1 | 5/2008 | Inoue |
| 2008/0127949 A1 | 6/2008 | Herald |
| 2008/0134970 A1 | 6/2008 | Straccia et al. |
| 2008/0276497 A1 | 11/2008 | Chou |
| 2009/0031898 A1 | 2/2009 | Foong |
| 2009/0084266 A1 * | 4/2009 | Yamada et al. ............... 96/135 |
| 2009/0120046 A1 | 5/2009 | Huff |

FOREIGN PATENT DOCUMENTS

| | | |
|---|---|---|
| CN | 201208892 | 3/2009 |
| DE | 202005020008 | 3/2006 |
| DE | 202006007096 | 10/2007 |
| DE | 202007003941 | 8/2008 |
| EP | 1 110 593 | 6/2001 |
| EP | 1 273 789 | 1/2003 |
| EP | 1 321 659 | 6/2003 |
| GB | 2327048 | 1/1999 |
| JP | 070124468 A | 5/1995 |
| JP | 09-075749 | 3/1997 |
| JP | 11-082192 | 3/1999 |
| JP | 2001227421 | 8/2001 |
| JP | 2001234781 | 8/2001 |
| JP | 2002332924 | 11/2002 |
| JP | 2007076989 | 3/2007 |
| JP | 2008080194 | 4/2008 |
| KR | 206119441 | 11/2006 |
| WO | WO 03/011758 | 2/2003 |
| WO | WO 2007/101469 | 9/2007 |
| WO | WO 2009/061533 | 5/2009 |

OTHER PUBLICATIONS

Freudenberg Nonwovens, "Air Filters", Automotive Engineering International Magazine (AEI) Online, Apr. 2005, www.sae.org/automag.

Mann & Hummel, "Hydrocarbon Adsorption", Automotive Engineering International (AEI) Magazine Online, Apr. 2005, p. 154, www.sae.org/automag.

Eastman Chemical Company, Product Brochure "Eastman Chlorinated Polyolefins," Publication GN-411C, Jun. 2004.

Eastman Advantis 510W Product Data Sheet [online]. Eastman Chemical Company, Oct. 31, 2008. Retrieved from the Internet on Dec. 12, 2008 at <URL:www.eastman.com/ProductCatalogApps/PageControllers/ProdDatasheet_PC.aspx?Product=71067127&sCategoryName=Generic>.

* cited by examiner

POLYMERIC TRAP WITH ADSORBENT

CROSS-REFERENCE TO RELATED APPLICATIONS

This application claims the benefit pursuant to 35 U.S.C. §119(e) of U.S. Provisional Application No. 61/186,161, filed on Jun. 11, 2009, which is hereby incorporated by reference in its entirety herein.

BACKGROUND

Evaporative emissions are hydrocarbon emissions, which are not from the exhaust. Evaporative emissions occur even when an engine, such an engine in an automobile, is not running. Sources of evaporative emissions include both fuel and non-fuel derived hydrocarbons. Non-fuel derived hydrocarbons are emitted by solvents, tires, carpet, glue etc. in an automobile and are typically only a new car problem. Fuel-derived hydrocarbon emission sources include the fuel tank, the engine, the exhaust gas recirculation (EGR) system and air intake system. In contrast to non-fuel derived hydrocarbon emissions, fuel-derived hydrocarbon emissions generally increase with time.

Increasing emissions regulations have led to an expansion of evaporative emission capture technology, and in particular, fuel-derived hydrocarbon emissions. It has been found that a significant amount of volatile hydrocarbons from several sources collect in the air intake system of the automobile engine after the engine has been shut off. Absent of an evaporative emission capture technology, these hydrocarbons are discharged into the atmosphere after the engine has been shut off. Thus, reducing or eliminating hydrocarbon emissions discharge in the air intake system is desirable.

A significant portion of a vehicle's evaporative emissions are emitted from the air intake system during the vehicle's off-cycle as a result of fuel injector leakage, residual fuel puddle evaporation, and blow-by gas from the positive crankcase ventilation (PCV) system. Ideally, the hydrocarbon emissions are retained with the air intake system until the powertrain is used again, when the emissions retention system releases the hydrocarbons to be consumed and controlled through the normal exhaust emission control systems.

Prior art solutions to controlling the outward flow of hydrocarbon emissions from air intake systems include careful shaping of the ducting and filter box; incorporation of carbon absorbents into the air intake system; and filters. A challenge for creating a hydrocarbon emissions absorber system is to minimize the impact on air intake restriction, add little extra weight to the system, and yet provide sufficient adsorption capacity for a particular application.

Accordingly, provided is a hydrocarbon adsorbent within the air intake system of a motor vehicle for adsorbing volatile hydrocarbons emitted after the engine has been shut-off, and thereby reduce or prevent the emission of such hydrocarbons into the atmosphere.

SUMMARY

Provided is an adsorbent and/or catalytic article, comprising at least one plastic surface and an adhered material on at least a portion of the plastic surface, wherein the adhered material comprises an adherent, an organic binder and a particulate material. The particulate material is selected from the group consisting of an adsorbent material, a catalytic material and combinations thereof. The adherent is one of an adhesion promoter and a metal coating. In an embodiment, the adherent is an adhesion promoter. In an embodiment, the adhesion promoter is selected from the group consisting of a chlorinated polyolefin and a maleated polyolefin.

In an embodiment of the article, the plastic is selected from the group consisting of polypropylene, nylon-6, nylon-6,6, aromatic nylon, polysulfone, polyether sulfone, polybutylene terephthalate, polyphthalamide, polyoxymethylene, polycarbonate, polyvinylchloride, polyester, and polyurethane. In an embodiment, the plastic is selected from the group consisting of polypropylene, polycarbonate, polyvinylchloride, polyester, and polyurethane.

In an embodiment of the article, the particulate material is an adsorbent material. In an embodiment, the adsorbent material is selected from the group consisting of a zeolite, activated carbon, silica gel, a metal-organic framework compound, and combinations thereof. In an embodiment, the adsorbent material is selected from the group consisting of a zeolite, activated carbon, and combinations thereof. In an embodiment, the adsorbent materials consists essentially of a zeolite, activated carbon, a combination of a zeolite and activated carbon, or a metal-organic framework compound.

In an embodiment of the article, the particulate material is a catalytic material. In an embodiment, the catalytic material comprises a photocatalyst.

In an embodiment of the article, the organic binder comprises a styrene/acrylic copolymer. In an embodiment, the organic binder has a low glass transition temperature (Tg) or a Tg of less than about 0° C.

In an embodiment, the article is an air intake system (AIS) component, comprising a substantially hollow interior chamber. The chamber has an inner surface and an outer surface, wherein the inner surface is plastic and a portion of the inner surface comprises the adhered material. In an embodiment of the AIS component, the adherent is an adhesion promoter. In an embodiment, the adhesion promoter is selected from the group consisting of a chlorinated polyolefin and a maleated polyolefin.

In an embodiment of the article as an AIS component, the component is selected from the group consisting of an air intake duct, an air cleaner housing, an air duct, and an air intake manifold. In an embodiment, the AIS component is an air cleaner housing. Optionally, the air cleaner housing further comprises an air filter. In an embodiment of the AIS component, the plastic is selected from the group consisting of polypropylene, nylon-6, nylon-6,6, aromatic nylon, polysulfone, polyether sulfone, polybutylene terephthalate and polyoxymethylene. In an embodiment, the plastic is selected from the group consisting of polypropylene, nylon-6 and nylon-6,6. In an embodiment, the plastic is selected from the group consisting of glass-filled polypropylene, mineral-filled polypropylene, glass-and-mineral-filled polypropylene, glass-filled nylon-6, mineral-filled nylon-6, and glass-and-mineral-filled nylon-6.

In an embodiment of the article as an AIS component, the adsorbent material is selected from the group consisting of a zeolite, activated carbon, silica gel, a metal-organic framework compound, and combinations thereof. In an embodiment, the particulate material is an adsorbent material comprising a zeolite, activated carbon or a mixture of a zeolite and activated carbon. In an embodiment, the adsorbent material consists essentially of a zeolite, activated carbon, a combination of a zeolite and activated carbon, or a metal-organic framework compound.

In an embodiment of the article as an AIS component, the organic binder comprises a styrene/acrylic copolymer. In an embodiment, the organic binder has a low glass transition temperature (Tg) or a Tg of less than about 0° C.

In an embodiment, the article is a patch comprising a plastic outward surface and an inward surface, wherein the outward surface comprises the adhered material.

Also provided is an air intake system comprising at least one adsorbent and/or catalytic article in the form of an air intake system component. In an embodiment, the air intake system comprises a plurality of such adsorbent and/or catalytic articles.

Additionally provided is a method for adhering a particulate material to a plastic surface.

In one aspect, the method comprises the steps treating a plastic surface with one of an adherent and flame/plasma to form a treated plastic surface, and depositing a composition comprising an organic binder and a particulate material on the treated plastic surface to form a coated plastic surface having improved adhesion of the particulate material to the plastic surface. The adherent can be selected from the group consisting of an adhesion promoter and a metal coating. In some embodiments, the treating step comprises applying an adhesion promoter to the plastic surface.

In another aspect, the method comprises the step of depositing a composition comprising an organic binder, an adhesion promoter and a particulate material on a plastic surface to form a coated plastic surface having improved adhesion of the particulate material to the plastic surface.

In the methods, the particulate matter can be selected from the group consisting of an adsorbent material, a catalytic material and combinations thereof. The plastic can be selected from the group consisting of polypropylene, nylon-6, nylon-6,6, aromatic nylon, polysulfone, polyether sulfone, polybutylene terephthalate, polyphthalamide, polyoxymethylene, polycarbonate, polyvinylchloride, polyester, and polyurethane. In some embodiments, the plastic is selected from the group consisting of polypropylene, nylon-6 and nylon-6,6. In some embodiments, the plastic is selected from the group consisting of glass-filled polypropylene, mineral-filled polypropylene, glass-and-mineral-filled polypropylene, glass-filled nylon-6, mineral-filled nylon-6, and glass-and-mineral-filled nylon-6.

In some embodiments of the methods, the adhesion promoter is selected from the group consisting of a chlorinated polyolefin and a maleated polyolefin.

In some embodiments, the coated plastic surface having improved adhesion has a coating retention of at least about 95% as measured by tape test. In some embodiments, the coated plastic surface having improved adhesion has adhesion improved by at least about 5% relative to a coated plastic surface in the absence of the adherent.

In some embodiments of the methods, the plastic surface is comprised by an air intake system component.

In an embodiment, the particulate material is an adsorbent material. In an embodiment, the adsorbent material is selected from the group consisting of a zeolite, activated carbon, silica gel, a metal-organic framework compound, and combinations thereof. In an embodiment, the adsorbent material is selected from the group consisting of a zeolite, activated carbon, and combinations thereof. In an embodiment, the adsorbent materials consists essentially of a zeolite, activated carbon, a combination of a zeolite and activated carbon, or a metal-organic framework compound.

In an embodiment, the particulate material is a catalytic material. In an embodiment, the catalytic material comprises a photocatalyst.

In an embodiment, the organic binder comprises a styrene/acrylic copolymer. In an embodiment, the organic binder has a low glass transition temperature (Tg). In an embodiment, the organic binder has a Tg of less than about 0° C.

Also provided is a method for adhering a particulate material to a molded plastic article. The method comprises the steps of applying an adhesion promoter to an inner surface of a mold cavity, introducing plastic into the mold cavity to form a treated molded plastic article, and removing the treated molded plastic article from the mold cavity. A composition comprising an organic binder and a particulate matter is adhered to the treated molded plastic article by one of: i) depositing the composition on the adhesion promoter-treated inner surface of the mold cavity prior to the introducing step; ii) depositing the composition on the treated molded plastic article after the removing step; or iii) combining the composition with the adhesion promoter prior to the applying step.

The particulate matter can be selected from the group consisting of an adsorbent material, a catalytic material and combinations thereof. In an embodiment, the particulate material is an adsorbent material. In an embodiment, the adsorbent material is selected from the group consisting of a zeolite, activated carbon, silica gel, a metal-organic framework compound, and combinations thereof. In an embodiment, the adsorbent material is selected from the group consisting of a zeolite, activated carbon and combinations thereof. In an embodiment, the adsorbent materials consists essentially of a zeolite, activated carbon, a combination of a zeolite and activated carbon, or a metal-organic framework compound.

In an embodiment, the particulate material is a catalytic material. In an embodiment, the catalytic material comprises a photocatalyst.

The plastic can selected from the group consisting of polypropylene, nylon-6, nylon-6,6, aromatic nylon, polysulfone, polyether sulfone, polybutylene terephthalate, polyphthalamide, polyoxymethylene, polycarbonate, polyvinylchloride, polyester, and polyurethane. In an embodiment, the plastic is selected from the group consisting of polypropylene, polycarbonate, polyvinylchloride, polyester, and polyurethane.

In an embodiment, the adhesion promoter is selected from the group consisting of a chlorinated polyolefin and a maleated polyolefin.

In an embodiment, the organic binder comprises a styrene/acrylic copolymer. In an embodiment, the organic binder has a low glass transition temperature (Tg). In an embodiment, the organic binder has a Tg of less than about 0° C.

DETAILED DESCRIPTION

Figure 1:
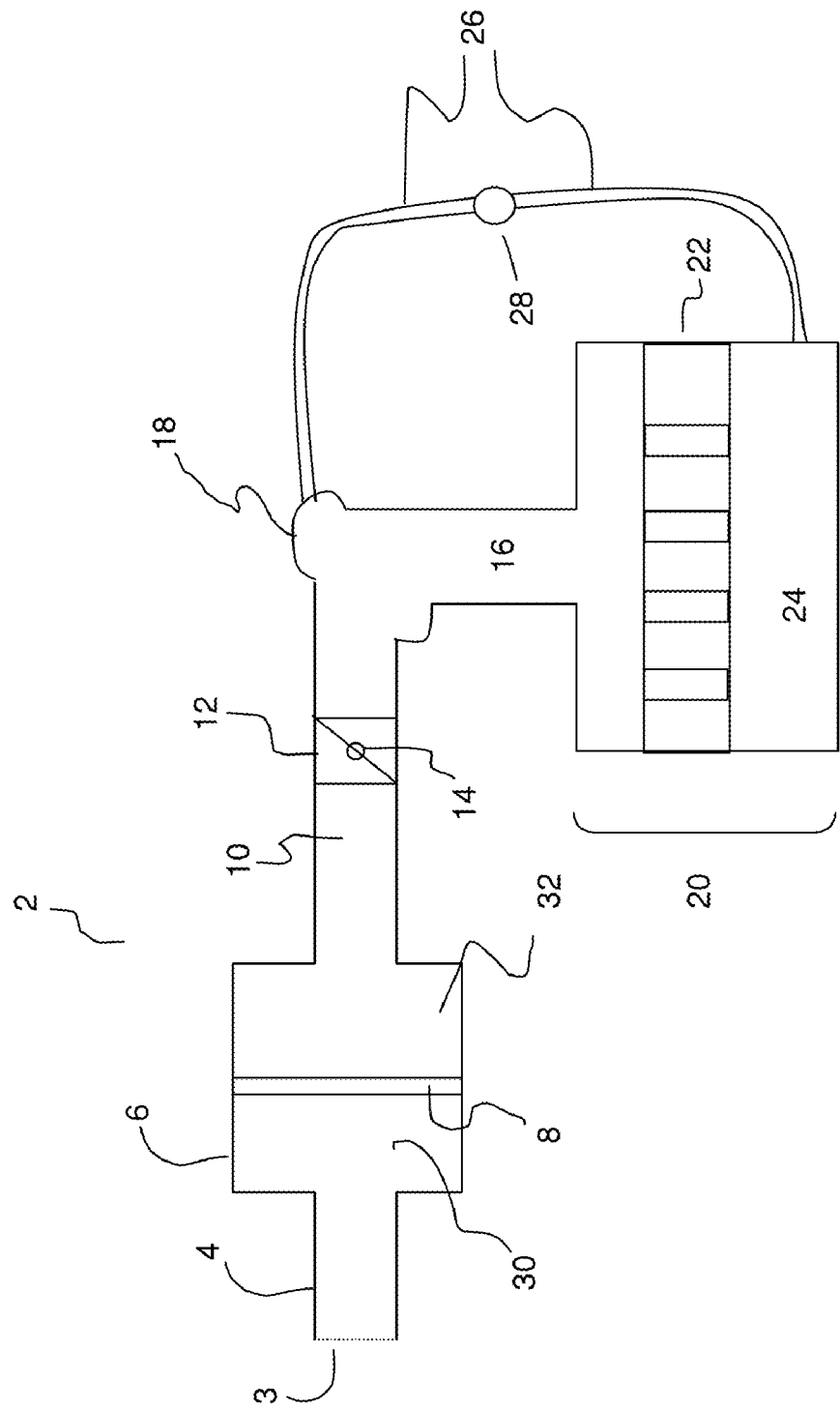
FIG. 1 is a schematic representation of an air intake system of an internal combustion engine.

Provided is a method of adhering a particulate material, such as a hydrocarbon adsorbent material and/or a catalytic material, to a plastic surface thereby preparing a coated plastic surface, and products comprising the adhered material. The method provides durable adhesion of the particulate material to a plastic surface, while retaining the functionality of the particulate material as an adsorbent and/or catalyst. In an embodiment, a chlorinated polyolefin, a nonchlorinated polyolefin, a maleated chlorinated polyolefin, or a maleated nonchlorinated polyolefin is employed in the method. Chlorinated polyolefins and nonchlorinated polyolefins are known in the art for adhering paint to surfaces. Paint comprises binder material, pigment and/or dye and other optional components. The predominant component of paint is the binder material, which is the film-forming component of paint. In contradistinction, the method described herein employs a chlorinated polyolefin or nonchlorinated polyolefin, which is optionally maleated, to adhere a particulate material to a plastic surface, wherein only a low binder amount is needed. Accordingly, one advantage of the method is the provision of excellent adhesion of a functionally-active material to a plastic surface, while requiring only very low binder amounts. The low binder amount contributes to the preservation of catalytic and/or adsorbent functionality of the particulate material. In an embodiment, the plastic surface coated in accordance with the method described is a plastic surface of a patch. The opposing surface of the patch comprises or accepts an adhesive material. The coated patch can be positioned in any location where the presence of the adsorbent and/or catalytic material is beneficial. The advantages of a coated patch include use in small locations and use of less particulate material because the patch enables the material to be concentrated in the area where it is needed for its adsorbent and/or catalytic function. Advantageously, the patch can be applied to pre-existing components of an air intake system or other evaporative emissions control components, to introduce or augment evaporative emissions control.

In an embodiment, the method enables the preparation of a component for an air intake system in which an inner surface of the component is coated with an adsorbent or catalytic material for minimizing or eliminating hydrocarbon emissions discharge from the air intake system during engine off cycles into the atmosphere. Accordingly, also provided is a component for use in an air intake system that does not require an extra component, such as a filter or metal monolith, to be incorporated into the air intake system. This aspect advantageously reduces both the assembly cost and the complexity of the air intake system comprising the hydrocarbon trap system, compared to prior art solutions. Furthermore, since the adsorbent or catalytic material of the trap system is not directly in the air flow path, the hydrocarbon trap system has minimal restriction on air intake, thereby minimizing the adverse impact on horsepower. The system can be particularly useful for vehicles required to meet the California Partial Zero Emission Vehicle (PZEV) regulations. Other plastic components, such as honeycombs, plastic automobile cabin parts and filters, components for evaporative emissions canisters or hydrocarbon scrubbers, and components for evaporative emissions control in small off-road engines such as lawnmowers, string trimmers, and all-terrain vehicles, can also be coated using the provided method.

I. Method Steps

The inner surfaces of the various components of an automotive air intake system are exposed to evaporative emissions containing hydrocarbons, thus, making these surfaces ideal for application of the hydrocarbon adsorbent coating to trap hydrocarbons before the hydrocarbons can be released to the ambient atmosphere. An automotive air intake system is typically made of molded plastic. While different plastics may be used, filled polypropylene and filled nylon, such as glass-filled, mineral-filled, or glass-and-mineral filled polypropylene or nylon, are the most common plastics used for air intake systems. Plastic represents a very challenging substrate for coating with an adsorbent or catalyst material. Most plastics, and especially polypropylene, are low polarity, which results in weak interactions with coatings. Standard practice for catalyst coatings is to use inorganic binders (e.g., alumina, silica, titania, etc.) which require high temperature calcination (e.g. >400° C.). It is not possible, however, to use these high temperature, inorganic binders on plastic substrates. Therefore, non-conventional low temperature organic polymer binders, such as styrene acrylic binders, have been employed and are efficacious for adhering catalytic material or adsorbent material to metal surfaces. See, for instance, commonly-assigned U.S. Pat. No. 7,422,628 and U.S. Publication Nos. 2003/0166466 and 2007/0107701.

As shown herein, however, adherence of a particulate adsorbent material to plastic surfaces using substantially only an organic binder does not provide durable adherence. It has been discovered that treatment of a plastic surface with an adherent prior to coating with a particulate adsorbent material greatly improves the adhesion of the adsorbent material to the plastic surface. Treatment of the surface comprises treatment with an adherent, or with a flame/plasma treatment. Treatment with an adherent comprises treatment with an adhesion promoter or application of a metal coating, e.g., vapor deposition or thermal spray. It has further been discovered that improved adhesion can also be obtained by combining an adhesion promoter with a particulate material, an organic binder and optionally a dispersant and/or surfactant, and applying the mixture to a plastic surface untreated with an adhesion promoter.

As used herein, an "adhesion promoter" refers to a substance that promotes the adhesion of a coating to a substrate. Generally, an adhesion promoter has two structural domains: a first domain that interacts with at least one component of the substrate and a second domain that interacts with at least one component of the coating. Exemplary adhesion promoters are chlorinated polyolefins, nonchlorinated polyolefins and maleated polyolefins (that can optionally also be chlorinated). Metal coatings can be applied to a plastic surface by vapor deposition or thermal spray techniques, which are generally known in the art. See, e.g., U.S. Publication No. 2008/0254227. Flame or plasma treatments are similarly known in the art. See, for instance, U.S. Publication No. 2008/0134970.

As used herein, "improved adhesion" refers to adhesion obtained using an adhesion promoter as compared to adhesion obtained in the absence of the adhesion promoter. Adhesion can be assessed by any method known in the art. Three exemplary adhesion tests include: tape test (ASTM D3359); ultrasonic water bath test; and freeze/thaw adhesion test. These assays measure under specific conditions the extent of coating loss, which can be expressed as percent coating loss. Coating retention is calculated by subtracting percent coating loss from 100%. For instance, a coating loss of 25% indicates a 75% coating retention. When assessed using the tape test, adhesion is improved by the method at least about 10-fold, at least about 13-fold, at least about 14-fold or at least about 15-fold. When assessed using the ultrasonic water bath test, adhesion is improved by the method at least about 5%, at least about 6%, at least about 7% or at least about 7.5%. In absolute values, the method provides a coating retention of at least about 75%, at least about 85%, at least about 90% or at least about 95%, when assessed by the tape test. When assessed by the ultrasonic water bath test, the method provides a coating retention of at least about 95%, at least about 96%, at least about 97% or at least about 98%.

In one aspect, the method comprises treating the surface of a plastic article with either an adherent or with a flame/plasma treatment in order to improve adhesion. Subsequently, a composition comprising a particulate hydrocarbon adsorbent material and/or a particulate catalytic material, and an organic binder is deposited on the treated plastic surface. The composition is typically in the form of a slurry. Each of these two steps may be followed by a drying step, typically at a low temperature. Low temperature, as used herein, refers to a temperature less than typical calcination temperatures, which range from about 300° C. to about 800° C. The drying temperature can be influenced by the particular binder in the composition, the type of plastic, and the adherent used. The skilled artisan is able to determine appropriate drying temperatures and durations based on conventional methods in the art. Optionally, the plastic surface can be cleaned prior to the surface treatment, in order to maximize the efficacy of the adhesion promoter.

In some embodiments, the surface treatment is treating the plastic surface with an adhesion promoter. In some embodiments, the adhesion promoter can be a chlorinated polyolefin (CPO). As shown herein, treatment of a polypropylene or nylon-6 surface with a CPO prior to coating with an adsorbent material improves adhesion of the adsorbent material, in particular when using a coating comprising a styrene/acrylic binder. In some embodiments, the adhesion promoter can be a maleated polyolefin.

In one aspect, the plastic article can be a plastic patch. A plastic patch is a substantially planar body, having length and width dimensions substantially larger than thickness dimension, and having an inward and an outward plastic surface. Generally, the length and width dimensions, as well as the thickness, of the patch can be determined based on the intended use. The length and width dimensions, for example, can range from millimeters to meters. Depending on the intended use, the patch can range in thickness from micrometers to centimeters or thicker, for example. A particulate material is adhered to the outward plastic surface of the patch in accordance with the method described herein. The final dry coating on the outward plastic surface typically can have a thickness of about 100-500 µm and a loading of about 100-250 mg/in$^2$. The actual desired thickness/loading of the coating can be adjusted as necessary in order to trap sufficient evaporative hydrocarbon emissions during the engine-off cycle, in order to meet the required evaporative emission control standard. The inward plastic surface comprises or accepts an adhesive material to adhere the patch to a surface exposed, for instance, to evaporative emissions. Accordingly, the adhesive material is typically a material that provides adhesion of the patch to a plastic or metal surface. The adhesive material should withstand, without substantial loss of adhesion, repeated and cyclic expose to high temperatures and gaseous environments. Suitable adhesives are well known in the art.

The patch can be circular, rectangular, arranged in a strip, or configured in any other shape desired. The patch can be stiff or flexible, depending on the intended use. In an embodiment, the patch can be formed from a tough, stretch and tear resistant material. A flexible patch material can be desirable so that the patch can conform to the article to which it is adhered. The patch material can be in the form of a single layer, multiple layers, or a foam. The patch can be a laminate of plastic or of plastic and non-plastic layers. Alternatively the patch can be a single plastic layer.

In another aspect, the method comprises applying an adhesion promoter to an inner surface of a mold cavity for shaping a plastic component, such as an air cleaner housing or an air intake duct, then introducing the hot polymer into the mold cavity. After the polymer cools and hardens, the mold is removed and the particulate material can be applied to the plastic surface comprising the adhesion promoter. The adhesion promoter can be applied to the mold before, during, or after the application of a mold release agent. In embodiments where the adhesion promoter is a composition comprising a surfactant, it is contemplated that the adhesion promoter can be used instead of the mold release agent or with a reduced amount of mold release agent. It is further contemplated that the particulate material can be applied to the mold surface with the adhesion promoter (and optionally the mold release agent) prior to the introduction of the hot polymer. After the polymer solidifies, the mold is removed, thereby providing an adsorbent and/or catalytic article comprising adhered particulate material on at least a portion of the plastic surface.

In one embodiment, the surface treatment is accomplished by applying a CPO (~5% w/w in water) and quickly drying the article at 110° C. for about 5 minutes. A slurry containing an adsorbent or catalytic material can then be applied to the treated surface and dried at 110° C. for about 30 minutes. In one example, a zeolite coating was applied to this pre-treated surface resulting in a coating having a coating retention of about 96% compared to a coated surface without the adhesion promoter, which had a coating retention of about 6%, as measured by the tape test.

The adhesion promoter may be applied to the plastic surface by any method known in the art, such as spraying, dipping, brushing, coating, rolling etc. In some embodiments, the adhesion promoter is spray coated onto the plastic surface. In some embodiments, the adhesion promoter is evenly applied to the plastic surface. The amount of adhesion promoter to use in order to obtain the improved adhesion obtained in practicing the method is readily determined by the skilled artisan in view of the teachings herein and the knowledge in the art.

Similarly, the composition comprising a particulate material and an organic binder may be applied to the treated plastic surface by any known means in the art. Non-limiting examples include spray coating, powder coating, or brushing or dipping a surface into the slurry.

In another embodiment, the method comprises depositing a composition comprising a particulate hydrocarbon adsorbent material and/or a particulate catalytic material, an organic binder, and an adhesion promoter on a plastic surface. The plastic surface can be an untreated plastic surface (e.g, not pre-treated with an adherent). As demonstrated herein, the plastic surface can be untreated, while still achieving adhesion. Optionally, the plastic surface can be pre-treated with an adherent, such as an adhesion promoter. In an embodiment, a hydrocarbon adsorbent composition comprising activated carbon, a styrene-acrylic polymer organic binder, an adhesion promoter, and optionally a nonionic dispersant and/or surfactant can be prepared as a slurry for application to an untreated plastic surface. In an embodiment, the composition comprises about 69% (based on total solids) activated carbon, about 30% styrene-acrylic polymer organic binder, about 10% adhesion promoter and about 3% dispersant.

The composition for depositing on a plastic surface according to this embodiment can be prepared as a slurry. Pellets of activated carbon such can be loaded into a ball-mill with dispersant and enough water to form a 25 wt % solids suspension and can be milled down to a particle size of 90%≧25 µm. After the target particle size is achieved, the slurry can be diluted to 20% solids with the addition of more water and removed from the mill. The pH of the slurry can be adjusted to about 9 with a 30% solution of ammonium hydroxide. The organic binder and the adhesion promoter can then be mixed together and added to the slurry, which can then be rolled for 15 minutes to mix. Water can be added to the slurry at any time during the process as needed to maintain the fluidity of the slurry.

The slurry can then be applied, for instance, to the inner surface of an AIS as a wet slurry and can dried onto the inside surface of the AIS in a drying oven at about 110° C. for about 30 minutes to form the final coating. The final dry coating typically can have a thickness of about 100-500 µm and a loading of about 100-250 mg/in$^2$. The actual desired thickness/loading of the coating can be adjusted as necessary in order to trap sufficient evaporative hydrocarbon emissions during the engine-off cycle, in order to meet the required evaporative emission control standard.

The method is also contemplated for use with any article comprising a plastic surface to which a particulate material is beneficially adhered. A non-limiting example is adhering a photocatalyst onto a polycarbonate or polypropylene honeycomb. Such a photocatalyst-coated honeycomb is useful, for instance, to reduce or remove pollutants from automotive cabin air. In another embodiment, a component of an automobile interior, the component comprising a polyurethane or polyvinylchloride (PVC) surface is coated with a photocatalyst using the provided method. In yet another embodiment, a particulate catalytic material comprising a base metal oxide catalyst is adhered to a plastic filter. Yet another embodiment is adhering a hydrocarbon adsorbent and/or catalytic material onto a plastic sheet, such as a herringbone corrugated sheet, for use in an evaporative canister or hydrocarbon scrubber to reduce evaporative emissions from a fuel tank.

II. Plastic

The material to which the adsorbent and/or catalytic material is adhered is a plastic. The method may be used with any plastic to which a particulate material, e.g., an adsorbent or catalytic material, is beneficially adhered. Exemplary plastics include, but are not limited to, polypropylene, nylon-6, nylon-6,6, aromatic nylon, polysulfone, polyether sulfone, polybutylene terephthalate, polyphthalamide, polyoxymethylene, polycarbonate, polyvinylchloride, polyester, and polyurethane. The plastic is generally selected based on the end use of the plastic article. For a plastic article to be used in an automotive cabin to remove pollutants from the air, for instance, an article comprising a polycarbonate, polypropylene, polyester, or PVC surface is useful. A filter made, for instance, of polyester or polypropylene to which a base metal oxide catalytic material is adhered is useful for reducing ozone from indoor air, aircraft cabin air and automotive cabin air. Materials useful for a patch include, but are not limited to, polyethylene, polypropylene, polycarbonate, polyester, and the like.

For plastic articles used in an automobile air induction system (AIS), the selected plastic should, of course, be resistant to the temperatures existing in the AIS during various engine operating conditions, including prolonged idling. The plastic used in an AIS is commonly light weight. Additionally, the materials in an AIS should be resistant to oils, fuels, greases, etc. which are commonly employed for engine operation. Plastics useful in the method include, but are not limited to, polypropylene, nylon-6 or nylon-6,6, aromatic nylon, polysulfone, polyether sulfone, polybutylene terephthalate, polyphthalamide (PPA), and polyoxymethylene. In some embodiments, the plastic is polypropylene, nylon-6 or nylon-6,6. In some embodiments, the plastic is modified. In some embodiments, the plastic is a modified polypropylene or nylon. In one embodiment, the modified polypropylene is glass-filled, mineral-filled, or glass-and-mineral filled. In some embodiments, the modified polypropylene further comprises an elastomer, such as polybutadiene. A common thermoplastic polyolefin (TPO) used in an AIS comprising about 50-60% polypropylene, 20-30% elastomer and 10-20% inorganic fillers (e.g., glass fibers and/or minerals). In another embodiment, the modified nylon can be glass-filled, mineral-filled, or glass-and-mineral filled. Glass particles used as fillers in TPO are typically in the form of glass fibers. Minerals used for fillers are known in the art, and include, without limit, talc, kaolin, calcium carbonate, feldspar and silicas. Talc is commonly used in TPO. See, e.g., Kelleher, "Reinforced thermoplastics: composition, processing and applications" iSmithers Rapra Publishing, Vol. 6, no. 6, report 66, December 1993.

III. Adhesion Promoters

Adhesion promoters useful in the practice of the method include chlorinated polyolefins (CPOs) and nonchlorinated polyolefins. A polyolefin adhesion promoter comprises a polyolefin that has been modified to contain polar chemical groups, which can interact with components of coatings. For instance, polyolefins to which maleic anhydride is grafted are common in polyolefin adhesion promoters; such a polyolefin is referred to herein as a "maleated polyolefin." A maleated polyolefin can be nonchlorinated or can be chlorinated. "Polyolefin" as used herein refers to polypropylene, polyethylene, polybutene and propylene-alpha-olefin copolymer. A polyolefin may be crystalline or amorphous. A wide variety of chlorinated and nonchlorinated polyolefins are known in the art. As shown herein, adhesion of a functional material to plastic is improved by a variety of such adhesion promoters, including solvent-borne CPOs, waterborne CPOS, CPOs with low chlorine content, and nonchlorinated polyolefins. In some embodiments, the adhesion promoter is a CPO. In some embodiments, the CPO is a waterborne CPO. In some embodiments, the CPO is a solvent-borne CPO. In some embodiments, the adhesion promoter is a nonchlorinated polyolefin, such as Advantis 510 W or Hardlen EW-3015. In some embodiments, the adhesion promoter is a maleated polyolefin such as a maleated nonchlorinated polyolefin or a maleated chlorinated polyolefin.

Some examples of chlorinated polyolefins can be found in U.S. Pat. Nos. 4,683,264; 5,102,944; and 5,319,032. Chlorinated polyolefins are known in the art and are commercially available form various companies, including Nippon Paper, Tokyo, Japan, under the designation Superchlon; Eastman Chemical Company, Kingsport, Tenn. under the designation CPO; and Toyo Kasei Kogyo Company, Ltd., Osaka, Japan under the designation Hardlen. Chlorinated polyolefins are also described in commonly-assigned U.S. Pat. No. 6,939,916. Chlorinated polyolefins typically have a chlorine content (with respect to total solids) of at least about 10% by weight, or at least about 15% by weight and up to about 40% by weight. Chlorinated polyolefins having a chlorine content of up to about 25% by weight are used in some embodiments. In other embodiments, the chlorinated polyolefin has a chlorine content of up to about 20% weight. In yet other embodiments, the chlorine content of the chlorinated polyolefin is from about 10% to about 18% by weight. The chlorinated polyolefin in general may have number average molecular weight of from about 2000 to about 150,000, or from about 50,000 to about 90,000. Chlorinated polyolefins having number average molecular weights of from about 65,000 to about 80,000 are used in some embodiments.

Chlorinated polyolefin may be based on grafted or ungrafted polyolefins such as, without limitation, chlorinated polypropylene, chlorinated polybutene, chlorinated polyethylene, and mixtures thereof. The non-grafted olefin polymer for chlorination can be homopolymers of alpha monoolefins with 2 to 8 carbon atoms, and the copolymers can be of ethylene and at least one ethylenically unsaturated monomer like alpha monoolefins having 3 to 10 carbon atoms, alkyl esters with 1 to 12 carbon atoms of unsaturated monocarboxylic acids with 3 to 20 carbon atoms, and unsaturated mono- or dicarboxylic acids with 3 to 20 carbon atoms, and vinyl esters of saturated carboxylic acids with 2 to 18 carbon atoms.

The graft-copolymer-based resins are reaction products of an alpha-olefin polymer and a grafting agent. The alpha-olefin homopolymer of one or copolymer of two alpha-olefin monomers with two to eight carbon atoms can include: a) homopolymers such as polyethylene and polypropylene, and b) copolymers like ethylene/propylene copolymers, ethylene/1-butene copolymers, ethylene/4-methyl-1-pentene copolymers, ethylene/1-hexene copolymers, ethylene/1-butene/1-octene copolymers, ethylene/1-decene copolymers, ethylene/4-ethyl-1-hexene copolymers, and ethylene/4-ethyl-1-octene copolymers. Chlorinated grafted polypropylene can be prepared by solution chlorination of a graft-modified polypropylene homopolymer or propylene/alpha-olefin copolymer. Such grafting polymerization is usually conducted in the presence of a free radical catalyst in a solvent which is inert to chlorination. Fluorobenzene, chlorofluorobenzene carbon tetrachloride, and chloroform and the like are useful solvents. Typically, such grafted polypropylenes are those base resins that have been grafted with an alpha, beta-unsaturated polycarboxylic acid or an acid anhydride of an alpha, beta-unsaturated anhydride to form an acid- and/or anhydride-modified chlorinated polyolefin. Suitable grafting agents generally include maleic acid or anhydride and fumaric acid and the like.

Modified chlorinated polyolefins can include those modified with an acid or anhydride group. Examples of unsaturated acids that can be used to prepare a modified, chlorinated polyolefin include, without limitation, acrylic acid, methacrylic acid, maleic acid, citraconic acid, fumaric acid, and the anhydrides of these. The acid content of the chlorinated polyolefin is from about 0.5% to about 6% by weight, or from about 1% to about 3% by weight. In some embodiments, the acid number can be from about 50 to about 100 mg KOH/g for the chlorinated polyolefin, particularly for waterborne compositions. Also, the chlorinated polyolefin polymer can be a chlorosulfonated olefin polymer or a blend of the chlorinated polyolefin polymer with the chlorosulfonated olefin polymer, where chlorosulfonation may be effected by reaction of the grafted or non-grafted base resin with a chlorosulfonating agent.

Chlorinated polyolefins may be waterborne or solventborne, and may comprise additional components. Components useful in chlorinated polyolefins include surfactants and amines. The amines may be primary, secondary, or tertiary amines. Exemplary amines include 2-amino-2-methyl-1-propanol, triethylamine, triethanolamine, diethanolamine, dimethylethanolamine, 2-dimethylamino-2-methyl-1-propanol, and mixtures thereof. Other components include, but are not limited to, thickeners, rheology modifiers, buffering agents, etc.

While any adhesion promoter can be used in the methods and products described herein, it has been discovered that some CPOs provide markedly better adhesion to plastic than other CPOs. These CPOs include: Superchlon S-4196 (also called E-480T), CP 310 W, CP 349W, CP 347 W, BASF 867, BASF 934-0, BASF 934-30, Hardlen EW-5303, Hardlen EW-5313, and Hardlen EW-5515. In some embodiments, the CPO is selected from the group consisting of Superchlon S-4196, Hardlen EW-5515, CP 310 W, CP 349W, CP 347W and Hardlen EW-5315. Without wishing to be bound by any particular theory, the superior adhesion of some CPOs compared to others is believed to involve one or more of improved wettability, nature of the surfactant, nature of the interaction between the binder and the CPO, and the molecular weight distribution of the CPO.

IV. Adsorbent and Catalytic Components

Any particulate material may be used in the method and products. By "particulate material" is meant a material having a particle size from about 0.1 micron to about 50 microns, from about 0.5 microns to about 40 microns or from about 1 micron to about 30 microns. A particulate material may comprise a variety of particle sizes and can have varying distributions of sizes. For instance, in one embodiment, a particulate material comprises predominantly particles from about 0.5 to 1 micron and particles from about 10 microns to about 20 microns. In some embodiments, the particulate material is an adsorbent material and/or a catalytic material. In some embodiments, the particulate material comprises both an adsorbent material and a catalytic material. In an embodiment, the plastic surface is an inner surface of a component of an air intake system, and the particulate material is a hydrocarbon adsorbent material, a catalytic material for hydrocarbon reduction, or combinations thereof.

The hydrocarbon adsorbent can be silica gel, a molecular sieve, activated carbon, a metal-organic framework compound (MOF) or mixture thereof. The hydrocarbon adsorbent can be disposed on the plastic surface as a single layer or separate layers of silica gel, a molecular sieve, a MOF, or activated carbon. In some embodiments, the hydrocarbon adsorbent consists of a molecular sieve. In some embodiments, the hydrocarbon adsorbent can be a zeolite-based hydrocarbon adsorbent. In other embodiments, the hydrocarbon adsorbent comprises a mixture of a molecular sieve and an activated carbon. In some embodiments, the mixture comprises a zeolite and activated carbon. In some embodiments, the hydrocarbon adsorbent consists essentially of activated carbon. In some embodiments, the hydrocarbon adsorbent comprises or consists essentially of a MOF or a mixture of MOFs.

Metal-organic framework compounds (MOFs) are highly porous, crystalline compounds made up of metal ions or metal clusters coordinated with bridging ligands. MOFs are well-known in the art. Exemplary MOFs include, but are not limited to, aluminum terephthalate, copper benzene-1,3,5-tricarboxylate, and 2-methylimidazole zinc. See also U.S. Pat. No. 7,553,352.

In some embodiments, the hydrocarbon adsorbent can be a mixture of a zeolite-based hydrocarbon adsorbent and an activated carbon. The activated carbon is present in these mixtures from about 1 wt % to about 99 wt %, or from about 5 wt % to about 95 wt %, or from about 5 wt % to about 50 wt % or from about 5 wt % to about 25 wt %. Activated carbon is a highly porous carbon has a very large surface area, generally at least about 400 m$^2$/g. In some embodiments of the methods and components, the activated carbon can have a pore size of about 5 to about 500 angstroms. Activated carbon is well known in the art. See, e.g., commonly-assigned U.S. Pat. No. 7,442,232. See also U.S. Pat. No. 7,467,620. One advantage of blending activated carbon with zeolite is that the brittleness of the coating is reduced. The mixture also provides additional control over various properties such as adhesion, durability, and coatability of the resulting slurry and coating, while maintaining good hydrocarbon adsorption capacity. In addition, activated carbon has a higher inherent adsorption capacity for hydrocarbons than zeolite such as sulfuric acid leached beta zeolite. A third advantage is that carbon is a less expensive material than zeolite.

The zeolite-based hydrocarbon adsorbent material comprises one or more zeolite hydrocarbon adsorbents and optionally a binder. The adsorbent material may include any known natural or synthetic zeolite such as faujasite, chabazite, clinoptilolite, mordenite, silicalite, zeolite X, zeolite Y, ultrastable zeolite Y, ZSM zeolite, offretite, or a beta zeolite. In some embodiments, the zeolite can be selected from ZSM, Y, or beta zeolites. In some embodiments, the adsorbent comprises a beta zeolite of the type disclosed in U.S. Pat. No. 6,171,556 incorporated herein by reference in its entirety.

In some embodiments, a zeolite-based adsorbent material can be a zeolite having a high silica to alumina ratio. Generally, sieve materials having so-called three dimensional pore configurations are better than sieve materials having one- or two-dimensional pore configurations, although some of the latter function acceptably well. Acceptable materials typically have a micropore diameter of from about 3 to 8 angstroms. The zeolites, such as beta zeolites can have a silica/alumina molar ratio of from at least about 25/1, or at least about 50/1, with useful ranges of from about 25/1 to 1000/1, 50/1 to 500/1 as well as about 25/1 to 300/1, from about 100/1 to 250/1, or alternatively from about 35/1 to 180/1. In some embodiments, the beta zeolite can be an ion-exchanged beta zeolite, such as H/beta zeolite and Fe/beta zeolite.

In some embodiments, zeolites include ZSM, Y and beta zeolites; in some embodiments the zeolite is a beta zeolite. Zeolites can be treated to reduce the number of acid sites. This can be accomplished by leaching the zeolite with an organic or inorganic acid. Acids include strong inorganic acids, such as sulfuric acid, nitric acid, hydrochloric acid, phosphoric acid and the like, and carboxylic acids such as trifluoro acetic acid, and dicarboxylic acids such as oxalic, malonic, succinic, glutaric, adipic, maleic, fumaric, phthalic and the like. Useful acids include polyacids, difunctional acids, or dicarboxylic acids with oxalic acid. The acid use is at a concentration of about 0.02 to about 12N, or about 0.1 to about 10N, and a solid zeolite concentration of about 0.01 to about 1.0 g/ml or about 0.05 to about 0.5 g/ml. The leaching is conducted at a suitable temperature range, typically of from about 10 to about 100° C.; for example, at about 70 to about 100° C. when using sulfuric acid and from about 10 to about 50° C. when using oxalic acid. The leaching is conducted for a sufficient time to achieve the desired silica to alumina ratio attainable at the leach conditions and concentrations, and is typically from about 0.5 to about 5 hours, or from about 0.5 to about 3 hours.

The zeolite can be steam treated with steam at from about 350 to about 900° C. In some embodiments, the stream treatment is conducted at from about 400 to about 800° C., from about 500 to about 750° C., or from about 550 to about 750° C. The steam temperature can be increased at a suitable rate such as from about 100 to about 600° C. per hour. A useful steam concentration is from about 10 to about 100%, about 30 to about 100%, or from about 50 to about 100% with the balance being air. The steaming is typically conducted at atmospheric pressure. The duration of the steam treatment is sufficient to treat the zeolite and is typically from about 0.5 to about 48 hours, from about 0.5 to about 24 hours, from about 0.5 to about 8 hours or from about 0.5 to about 5 hours. The steam treatment is believed to reduce the acidity of the zeolite by removing at least some of the aluminum from the framework of the zeolite. Steam treated zeolites have been found to have an increased durability when used to adsorb hydrocarbons in gaseous streams and to resist coke formation. In some embodiments, the zeolite can be treated with both leaching and steam treatment. In one embodiment, the zeolite is first acid leached followed by steam treatment. Optionally, the steps of steam treatment and steaming can be repeated in any desired order. For example, leached and steamed zeolite can be repeatedly leached followed by steaming. In a specific embodiment the zeolite can be leached, steamed, and leached again.

A useful method to treat beta zeolite is disclosed, for example in CN 1059701A, published Mar. 25, 1992 and herein incorporated by reference. This reference discloses a high Si beta zeolite produced by calcining to remove nitrogen compounds from a beta zeolite made through an organoamine template process. Leaching the beta zeolite is accomplished with an organic or inorganic acid solution having a concentration of 0.02 to 12N, or of 0.1 to 10N, and a solid zeolite concentration of about 0.01 to about 1.0 g/ml or of about 0.05 to about 0.5 g/ml at from about 10 to about 100° C. for about 0.5 to about 5 hours, or for about 1 to about 3 hours. The leaching is followed by treating the zeolite with steam at from about 400 to about 900° C. with the steam temperature increasing at from about 100 to about 600° C. per hour. A useful steam concentration is 100% at a system pressure of 50 to 500 KPa. The duration of the steam treatment is from 0.5 to 5 hours.

In one embodiment, the hydrocarbon adsorbent can be in the air intake system, which is generally not subject to extremely high temperatures, such as temperatures greater than about 300° C. However, the zeolite may be treated to maintain hydrocarbon adsorption efficiency at high temperatures (300° C. to 800° C.), such as in automobile exhaust streams. Zeolite, when used in such environments, tends to lose adsorption efficiency, primarily due to clogging of the pores and/or collapse of the zeolite framework. The aluminum in the zeolite framework imparts the acidity, which affects the durability of zeolite, particularly at high temperature. Maintenance of a stable zeolite framework can be attained by controlling the conditions under which the zeolite is treated. Such conditions include acid concentrations, steam temperatures and the like. Milder conditions reduce the tendency for the zeolite framework to deteriorate during treatment and permit the framework to be stabilized at the location where the alumina was removed.

Acid leaching methods increase the silica to alumina ratio of zeolite and reduce acidity of the zeolite; however, such methods are believed to remove aluminum atoms indiscriminately. Methods such as steaming remove the aluminum from the framework of the zeolite preferentially at the Bronsted acid sites. Steam treatment alone, or in combination with acid leaching, results in a more durable zeolite for use as a hydrocarbon adsorber in high temperature environments.

Any catalyst that is beneficially adhered to a plastic surface can be used in the methods and products described herein. Catalysts for treating pollutants associated with automobile evaporative emissions and exhaust are well-known in the art. For instance, commonly-assigned U.S. Patent Publication 2003/0166466 discloses numerous catalysts useful for treating hydrocarbons and carbon monoxide, among other pollutants. Exemplary catalysts are also disclosed in commonly-assigned U.S. Pat. No. 6,818,254. For use in air intake systems, catalysts that convert hydrocarbons to carbon dioxide and water can be particularly useful. Reactions catalyzed in an air intake system can be beneficially catalyzed by catalyst that cause the reaction of targeted pollutants at the space velocity of the air as it contacts the surface, and at the temperature of the surface at the point of contact. Typically, these catalyzed reactions will be in the temperature range at the atmosphere contacting surface of from about 0° C. to about 130° C., more typically about 20° C. to about 105° C. and yet more typically from about 40° C. to about 100° C. There is no limit on the efficiency of the reaction as long as some reaction takes place. Conversion efficiency for hydrocarbons and partially oxygenated hydrocarbons can be at least about 10%, at least about 15%, or at least about 25%. These conversion rates can be particularly useful where the atmosphere contacting surface is at ambient operating conditions of up to about 110° C. The conversion efficiency is based on the mole percent of the particular pollutants in the air which react in the presence of the catalyst composition.

Catalysts to treat unsaturated hydrocarbons including $C_2$ to about $C_{20}$ olefins and typically $C_2$ to $C_8$ mono-olefins, such as propylene and partially oxygenated hydrocarbons, have been found to be the same type as those for use in catalyzing the reaction of carbon monoxide. Accordingly, such catalysts can comprise at least one precious metal component, such as platinum and palladium. In some embodiments, the catalyst can be platinum. A combination of a platinum component and a palladium component results in improved hydrocarbons conversion at an increase in cost and is useful where greater conversion is desired and cost increase is acceptable. A catalyst material to treat hydrocarbons can comprise from about 0.01 to about 20 wt. % or from about 0.5 to about 15 wt. % of the precious metal component on a suitable support such as a refractory oxide support, with the amount of precious metal being based on the weight of the precious metal, (not the metal component) and the support. In embodiments where platinum is used, it can be present in amounts of from 0.01 to 10 wt. %, from 0.1 to 5 wt. % or from 1.0 to 5 wt. %. When loaded onto an air intake system inner surface, the catalyst loading can be about 1 to 150, or can be 10 to 100 grams of platinum per cubic foot ($g/ft^3$) of catalyst volume. When platinum and palladium are used in combination, there is from about 25 to 100 $g/ft^3$ of platinum and 50 to 250 $g/ft^3$ of palladium. In one embodiment, the composition comprises about 50 to 90 $g/ft^3$ of platinum and 100 to 225 $g/ft^3$ of palladium. In some embodiments, the refractory oxide support can be a metal oxide refractory which can be selected from ceria, silica, zirconia, alumina, titania and mixtures thereof. In some embodiments, the refractory metal oxide support is one of alumina and titania. In some embodiments, the catalyst is reduced.

Other useful compositions which can convert hydrocarbons to carbon dioxide and water include a platinum component supported on carbon or a support comprising manganese dioxide. Another composition useful to convert hydrocarbons comprises a platinum group metal component, such as a platinum component, a refractory oxide support, such as alumina or titania and at least one metal component selected from a tungsten component and rhenium component, in the metal oxide form. A combination of a platinum component and a palladium component results in improved CO conversion at an increase in cost and is most useful where greater conversion is desired and cost increase is acceptable.

In some embodiments, the support for a catalyst to treat hydrocarbons, such as low molecular weight hydrocarbons, particularly low molecular weight olefinic hydrocarbons having about from two up to about twenty carbons and typically two to about eight carbon atoms, as well as partially oxygenated hydrocarbons is selected from refractory metal oxides including alumina and titania. As with catalysts to treat carbon monoxide, reduced catalysts result in greater hydrocarbon conversion. A titania support can be useful since it results in a catalyst composition having enhanced ozone conversion as well as significant conversion of carbon monoxide and low molecular weight olefins. Also useful are high surface area, macroporous refractory oxides, such as alumina or titania having a surface area of greater than about 150 $m^2/g$, or ranging from about 150 to about 350, or from about 200 to about 300, or from about 225 to about 275 $m^2/g$; a porosity of greater than about 0.5 cc/g, typically ranging from about 0.5 to about 4.0 or about from about 1 to about 2 cc/g measured based on mercury porosometry; and particle sizes range from about 0.1 to about 10 µm. A useful material is Versal GL alumina having a surface area of about 260 $m^2/g$, a porosity of 1.4 to 1.5 cc/g and supplied by LaRoche Industries.

Catalysts for treating ozone and/or carbon monoxide may also be used in the methods and components described herein. A catalyst which can treat both ozone and carbon monoxide comprises a support, such as a refractory metal oxide support, on which is dispersed a precious metal component. The refractory oxide support can comprise a support component selected from the group consisting of ceria, alumina, silica, titania, zirconia, and mixtures thereof. Also useful as a support for precious metal catalyst components is a coprecipitate of zirconia and manganese oxides. In some embodiments, this support is used with a platinum component and the catalyst is in reduced form. This single catalyst has been found to effectively treat both ozone and carbon monoxide. Other useful precious metal components are comprised of precious metal components selected from palladium and platinum components. A combination of a ceria support with a palladium component results in an effective catalyst for treating both ozone and carbon monoxide. Other useful catalysts to treat both ozone and carbon monoxide include a platinum group component, such as a platinum component and/or palladium component or a platinum component alone, on titania or on a combination of zirconia and silica. A combination of a platinum component and a palladium component results in improved CO conversion at an increase in cost and is most useful where greater conversion is desired and cost increase is acceptable. Other useful compositions which can convert ozone to oxygen and carbon monoxide to carbon dioxide include a platinum component supported on carbon or on a support comprising manganese dioxide.

Catalysts for treating ozone also include manganese compounds including manganese dioxide, including non stoichiometric manganese dioxide (e.g., $MnO_{(1.5-2.0)}$), and/or $Mn_2O_3$. In some embodiments, manganese dioxides, which are nominally referred to as $MnO_2$ have a chemical formula wherein the molar ratio of manganese to oxide is about from 1.5 to 2.0, such as $Mn_8O_{16}$. Up to 100 percent by weight of manganese dioxide $MnO_2$ can be used in catalyst compositions to treat ozone. Alternative compositions which are available comprise manganese dioxide and compounds such as copper oxide alone or copper oxide and alumina.

The coating composition further comprises an organic binder that contributes to the adhesion of the material to the plastic surface, such as the inner surface of an air intake system component. The binder can used in amounts of from 0.5 to 20, or from 2 to 10, percent by weight of binder based on the weight of the material. The organic polymer may be a thermosetting or thermoplastic polymer and may be plastic or elastomeric. The polymeric binder may contain suitable stabilizers and age resistors known in the polymeric art. In some embodiments, the binder is a thermosetting, elastomeric polymer introduced as a latex into the adsorbent composition, optionally as an aqueous slurry. In some embodiments, the organic binder can have a low glass transition temperature, Tg. Tg is conventionally measured by differential scanning calorimetry (DSC) by methods known in the art. As demonstrated herein, use of binders having a low Tg contributes to increased resistance to rapid deformation. As used herein, a "low Tg" refers to a Tg of less than about 20° C. An exemplary binder having a low Tg is Rhoplex P-376. In some embodiments, the binder has a Tg less than about 0° C. An exemplary binder having a Tg less than about 0° C. os Rhoplex NW-1715K. Upon application of the coating composition and drying, the binder material fixes the hydrocarbon adsorbent particles and/or catalytic particles to themselves and the treated plastic surface, and in some cases, can crosslink with itself to provide improved adhesion.

Useful organic polymer binder compositions include polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly (vinyl halides), polyamides, cellulosic polymers, polyimides, acrylics, vinyl acrylics and styrene acrylics, polyvinyl alcohol, thermoplastic polyesters, thermosetting polyesters, poly (phenylene oxide), poly(phenylene sulfide), fluorinated polymers such as poly(tetrafluoroethylene) polyvinylidene fluoride, poly(vinylfluoride) and chloro/fluoro copolymers such as ethylene chlorotrifluoro-ethylene copolymer, polyamide, phenolic resins and epoxy resins, polyurethane, acrylic/styrene acrylic copolymer latex and silicone polymers. In some embodiment, the polymeric binder is an acrylic/styrene acrylic copolymer latex, such as Rhoplex P-376 (Rohm & Haas).

Considerations regarding the compatibility of the components of a slurry comprising a hydrocarbon adsorbent material and a polymeric binder, such as a latex emulsion, are known in the art. See for instance commonly-assigned U.S. Publication No. 2007/0107701. In brief, it is believed that if the hydrocarbon adsorbent material and latex emulsion particles do not mutually repel each other, irreversible agglomeration of the latex on the hydrocarbon adsorbent material will occur. These materials are therefore incompatible and the latex comes out of the emulsion. For those zeolites that generate a low pH mixture when dispersed in water, additional stabilization can be achieved by increasing the pH. The pH of the slurry can be controlled depending on the acidity of the adsorbent material, with pH levels being from about 4 to about 10. In some embodiments, the pH range can be from about 5 to about 8. In other embodiments, the pH range can be from about 6 to about 7.5.

A dispersant may be used with the polymeric binder. The dispersant may be anionic, non-ionic, or cationic and is typically utilized in an amount of about 0.1 to about 10 weight percent, based on the weight of the material. Suitable dispersants may include polyacrylates, alkoxylates, carboxylates, phosphate esters, sulfonates, taurates, sulfosuccinates, stearates, laureates, amines, amides, imidazolines, sodium dodecylbenzene sulfonate, sodium dioctyl sulfosuccinate and mixtures thereof. In some embodiments, the dispersant is a polycarboxylate ammonium salt, such as Tamol 165A (Rohm & Haas). While increasing the slurry pH or adding anionic dispersant alone may provide enough stabilization for the slurry mixture, best results may be obtained when both an increased pH and anionic dispersant are used.

Additional additives, such as thickeners and surfactants, may also be added to the adsorbent materials. Exemplary thickeners are a xanthan gum thickener or a carboxymethylcellulose thickener. A thickener makes it possible to achieve a sufficient amount of coating (and hence sufficient hydrocarbon adsorption capacity) on relatively low surface area substrates. The thickener may also serve in a secondary role by increasing slurry stability by steric hindrance of the dispersed particles. It may also aid in the binding of the coating surface. Surfactants can act as defoamers. In some embodiments, the surfactant is a low molecular nonanionic dispersant, such as Rhodoline 999 (Rhodia).

In some embodiments of the method, a hydrocarbon adsorbent composition comprising sulfuric acid-leached aluminosilicate zeolite, a styrene-acrylic polymer organic binder, xanthan gum and, optionally, a nonionic dispersant and/or surfactant is prepared as a slurry for application to a plastic surface that has been treated with a CPO to improve adhesion of the particulate adsorbent material to the plastic surface. In an embodiment, the composition comprises about 90% to about 93% (based on total solids) sulfuric acid-leached aluminosilicate zeolite, about 8% to about 8.5% styrene-acrylic polymer organic binder, and about 0.05 to about 0.1% xanthan gum.

The hydrocarbon adsorbent composition is prepared as a slurry. Sulfuric acid-leached aluminosilicate zeolite (SAL-beta zeolite) is slowly high-shear mixed into enough water to form a 55 wt % solids suspension and is milled with a continuous mill to a particle size of 90%≦25 μm. Typically, only one pass through a continuous mill is necessary to achieve this particle size. The slurry is then adjusted to a pH≧6 with a 30% solution of ammonium hydroxide. The styrene-acrylic polymer organic binder, such as Rhoplex P-376, and the xanthan gum are then sequentially added in, and the slurry is rolled for 15 minutes to mix after the addition of each ingredient. A surfactant, such as Rhodoline 999, is optionally added if foaming problems arise during processing. The final slurry is typically ~50 wt % total solids in suspension.

In other embodiments of the method, a hydrocarbon adsorbent composition comprising activated carbon and sulfuric acid-leached aluminosilicate zeolite, a styrene-acrylic polymer organic binder, xanthan gum and, optionally, a nonionic dispersant and/or surfactant is prepared as a slurry for application to a plastic surface that has been treated with a CPO to improve adhesion of the particulate adsorbent material to the plastic surface. In an embodiment, the composition comprises about 65% to about 70% (based on total solids) sulfuric acid-leached aluminosilicate zeolite, about 20% to 25% activated carbon, such as Norit CN 520 (Norit Americas, Marshall, Tex.), about 8% to about 8.5% styrene-acrylic polymer organic binder, about 0.05 to about 0.1% xanthan gum and, if present, about 1% to 1.3% dispersant.

The hydrocarbon adsorbent composition is prepared as a slurry. SAL-beta zeolite is slowly high-shear mixed into enough water to form a 55 wt % solids suspension and is milled with a continuous mill to a particle size of 90%≦25 μm. Separately, pellets of activated carbon such as Norit CN 520 are loaded into a ball-mill with enough water to form a 25 wt % solids suspension and are also milled down to a particle size of 90%≦25 μm. After the target particle size is achieved, if needed, the dispersant and surfactant are added, and the ball-mill is rolled for an additional 15 minutes to mix. The dispersant and/or the surfactant can also be added before and/or during the milling process. The SAL-beta zeolite slurry and the activated carbon slurry are combined so that the adsorbents are present in the mixture slurry at about a 3:1 ratio (by dry adsorbent weight). The mixture slurry is rolled for 15 minutes to mix. The organic binder and the thickener are then added in sequentially, and the slurry rolled for an addition 15 minutes after the addition of each ingredient. Water may be added to the slurry at any time during the process as needed to maintain the fluidity of the slurry. The final slurry is typically ~35-40 wt % total solids in suspension.

The surface treatment of an inner surface of, for instance, an AIS is accomplished by applying an undercoat of an adhesion promoter at 5 wt % CPO solids, such as Superchlon E-480T (also called Superchlon S-4196), which is a waterborne CPO, to an inside surface of the AIS. The adhesion promoter is diluted if necessary to about 5 wt % CPO solids before applying to the AIS inner surface. The CPO coating is dried at 110° C. for five minutes to form a 3-5 μm CPO resin film on the interior surface of the AIS.

The hydrocarbon adsorbent composition slurry is then applied to the treated inner surface of the AIS as a wet slurry and is dried onto the inside surface of the AIS in a drying oven at about 110° C. for about 30 minutes to form the final coating. The final dry coating typically has a thickness of about 100-500 μm and a loading of about 100-250 mg/in$^2$. The actual desired thickness/loading of the coating can be adjusted as necessary in order to trap sufficient evaporative hydrocarbon emissions during the engine off cycle in order to meet the required evaporative emission control standard.

Thus, a air intake system component is produced, wherein a portion of an inner plastic surface of the component comprises adhered adsorbent material comprising an adherent, an organic binder and a particulate material.

V. Air Intake System

Any plastic article that beneficially has a coating of a particulate adsorbent and/or a particulate catalytic material may be prepared according to the method. In one embodiment, the plastic article is a component of an air intake system for an automobile engine. Components of an air intake system typically comprise a three-dimensional hollow interior space or chamber defined at least in part by a shaped planar material, such as molded thermoplastic olefin. By "shaped planar material" is meant a material having two dimensions that are substantially greater than the third dimension, the material having been molded or otherwise shaped into a three-dimensional shape. By "hollow" is meant a cavity substantially filled with a fluid, such as air or exhaust gas. The planar material comprises an inner surface, which is the side facing the hollow interior chamber and an outer surface, which is the side not facing the interior chamber.

FIG. 1, which is merely exemplary in nature, depicts a schematic drawing of an air intake system 2. The system 2 comprises an opening 3 of an air intake duct 4 fluidly connected to an air cleaner housing 6, which defines at least in part a hollow an interior space in which an air cleaner 8 is located. While the air cleaner housing 6 is depicted as rectilinear, it can be any shape, such as oval or round. The air cleaner 8, functions to absorb dirt and other particulate matter (e.g., dust particles), which may be present in the ambient air and divides the air cleaner housing into a dirty air portion 30, located upstream from the air cleaner 8 and a clean air portion 32 located downstream from the air cleaner 8. It should be recognized that the air cleaner can be any shape and size. The air cleaner housing 6 is connected to an air duct 10 which connects with a throttle body 12 comprising throttle valve 14. An air intake manifold 16 comprising a surge tank 18 connects the throttle body to the engine 20, which comprises the fuel injector and piston assembly 22 and the crankcase 24. A hose 26 comprising a PCV valve 28 is in communication with both the crankcase 24 with the surge tank 18. The components of the air intake system may be made of metal, plastic, or plastic metal composites. The method is useful, for instance, for an air intake component comprising an inner surface made partially or entirely of plastic.

When the engine 20 is running, the air intake system 2 draws air in from the environment via the air intake duct 4. The air is drawn in through the opening 3 of air intake duct 4, into the dirty air portion 30 of the interior space of the air cleaner housing 6, and through the air cleaner 8 contained therein and into the clean air portion 32 of the interior space. The air cleaner 8 collects the dirt and other particulate matter, which may be in the ambient air, creating a clean air stream. The clean air stream exits from clean air portion 32, via air duct 10. The clean air stream passes through the throttle body 12 with its throttle body valve 14 and passes into the air intake manifold 16 which comprises surge tank 18. The clean air is transported into engine 20, comprising a portion 22 containing fuel injectors and piston assembly and a crankcase 24, for use in combustion. Crankcase combustion gases are fed back to the intake manifold 16 via breather tube 26, which contains a positive crankcase ventilation (PCV) valve 28.

The adsorbent coating can be applied in one or more of several possible locations within an air intake system. It can be applied to the inner surface of the air intake duct 4. It can be applied to the inner surface of the air cleaner housing 6 where the inner surface contacts the dirty air portion 30. This location has the advantage that any coating loss would be captured by the air filter 8, protecting the engine 20 from potential harm. The disadvantage is that this location will have to endure a great amount of dust and other contaminants. The adsorbent coating can be applied to the inner surface of the air cleaner housing 6 on the inner surface which contact the clean air portion 32. The coating can also be applied to the inner surface of air duct 10, the inner walls of the throttle body 12, and/or air intake manifold 16 through which the clean air moves. These locations on the clean side of the air filter have the advantage of being protected from outside contamination. However the coating may still be exposed to contamination from engine oils, etc. In these locations, the adhesion requirement is extreme since it is undesirable to have any coating loss flow into the engine. The throttle body 12 is typically metal and has a very low surface area. The air intake manifold 16 has the disadvantage of high temperature and exposure to high concentrations of fuel vapors and contaminants, as there is a large decrease in hydrocarbon concentration from the engine side of the throttle body to the other. The coating can be applied to a single location or to plural locations within the air intake system. A given location may be entirely coated with the adsorbent, or may be partially coated. Coating may be substantially the same thickness throughout a location or throughout the air intake system or may be of varying thickness so as to increase the amount of adsorbent or catalytic material in one location as compared to another location with a thinner coating.

Evaporative emissions from the engine are adsorbed by the hydrocarbon adsorbent coating during engine off times. During engine operation, atmospheric air is introduced into the air intake system, whereby the hydrocarbons, which were previously adsorbed by the hydrocarbon adsorbent are desorbed and circulated back to the engine for combustion through the air filter outlet duct.

VI. Other Applications and Articles

The method provided can be used to coat any plastic surface with a particulate material. Evaporative canisters containing adsorbent material and hydrocarbon scrubbers are used to reduce evaporative emissions from the fuel tank in vehicles. See, for instance U.S. Pat. Nos. 5,924,410, 7,114,492, and 7,160,361. It is contemplated that the method provided can be used to prepare such components. In one embodiment, a polymer sheet, such as a herringbone corrugated sheet, can be coated on both sides with particulate material, such as a hydrocarbon adsorbent, using the provided method. The coated sheet can be rolled up and inserted into a plastic tube for use, for instance, in an evaporative canister or in a hydrocarbon scrubber.

Non-limiting examples of yet other applications are as follows. A polycarbonate or polypropylene honeycomb can be coated with a photocatalyst for use in removing pollutants from automotive cabin air. In addition, an interior automotive surface, such as polyurethane or polyvinylchloride, can be coated with a photocatalyst. In addition, a filter made, for instance, of polyester or polypropylene, can be coated with a base metal oxide catalyst in order in order to remove ozone in applications such as indoor air, aircraft cabin air, or automotive cabin air. Plastic patches comprising an adhesive on one surface and a particulate material on another surface can be prepared. Such patches can be useful for introducing a particulate adsorbent material into a small space of into an item such as a small off-read engine after manufacture of the item.

EXAMPLES

Embodiments of the methods and products are further described in detail by reference to the following experimental examples. These examples are provided for purposes of illustration only, and are not intended to be limiting unless otherwise specified. Thus, the methods and products should in no way be construed as being limited to the following examples, but rather, should be construed to encompass any and all variations which become evident as a result of the teaching provided herein.

Example 1

Adsorbent Coating on Air Intake System

A hydrocarbon adsorbent material was coated on the inner surface of a commercially-available air cleaner housing of an air intake system. The air cleaner housing was made of glass- and-mineral filled nylon 6,6. The adsorbent material was a sulfuric-acid-leached beta zeolite (SAL-beta zeolite). The adsorbent coating composition was: SAL-beta zeolite (92.5%, based on total dry solids), Rhoplex-P-376 styrene-acrylic binder (7.4%), and Kelzan CC xantham gum thickener (0.1%). The coating was applied as an aqueous slurry (50% solids in water, pH 6) with a spray gun and then dried at 110° C. for 30 minutes. The capacity of the adsorbent-coated air cleaner housing to adsorb hydrocarbon was assessed by a hydrocarbon emission breakthrough test. Methyl-pentane was injected as a representative hydrocarbon of air intake system emissions. The engine side end of an AIS was sealed. The seal was fitted with a rubber septum to allow methyl-pentane to be injected into the engine side of the AIS (single injection only) with a syringe. The other end of the AIS was connected to a flame ionization detector (FID) to monitor any hydrocarbons emissions breaking through the AIS.

Figure 2:
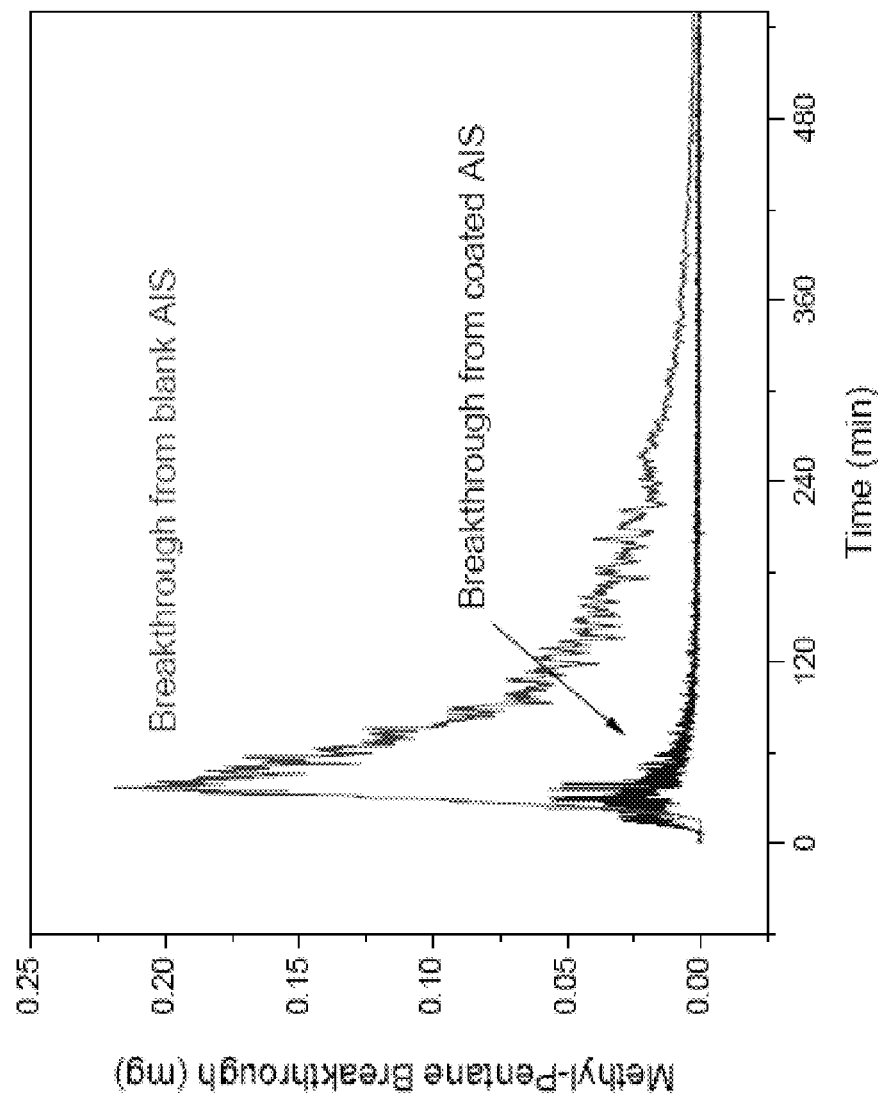
FIG. 2 is a graph of methyl-pentane breakthrough from an air cleaner housing comprising a zeolite coating on its inner surface compared to an air cleaner housing without such a coating. AIS=air intake system.

The results are shown in FIG. 2. The adsorbent coating reduced hydrocarbon emissions by about 86%. Thus, a hydrocarbon adsorbent material coated on the inner surface of an air intake system, such as the air cleaner housing, is effective for reducing evaporative emissions.

Example 2

Adhesion Testing of Zeolite on Various Plastics

To examine the adhesion of adsorbent material to plastic, an ultrasonic water bath adhesion test was used to test adhesion to eight types of plastics. The plastics tested were: polysulfone, polyether sulfone, aromatic nylon, polypropylene, nylon 6,6, polybutylene terephthalate, polyoxymethylene, and nylon 6. Adhesion was measured as percent coating loss. Retained coating was calculated as 100% minus percent coating loss. Thus, a low coating loss corresponds to a high coating retention, which is indicative of good adhesion. The samples were coated as described for Example 1 with the same coating composition.

For the ultrasonic water bath adhesion, the samples are dried in a mechanical convection oven at 110° C.±2° C. for 30 minutes. After drying, samples are placed in a desiccator to cool. After the samples cool, they are weighed to the 0.001 gram. Samples are put back into the oven to dry for an additional 2 hours at 110° C.±2° C. The samples are again cooled in a desiccator and then weighed to the 0.001 gram ("Start Weight"). Each sample is placed in a separate glass beaker (1000 ml) filled at least three-quarters with DI water. The beakers are placed in an ultrasonicator bath filled with DI water; the water levels are adjusted as needed so that the water level in the beaker and in the bath is the same. Beakers are sonicated individually in the center of a variable power, multiple frequency ultrasonicator bath (Crest Ultrasonics bath model number 4HT-710-3-ST and generator model number 4G-250-3, or equivalents) and in a random order. Each beaker is sonicated for 10 minutes at the low frequency modulation setting and a power control setting of 6. The sample is removed from the beaker and rinsed gently with DI water. Excess water is gently shaken off, and the plaques dried in a 110° C.±2° C. oven for a minimum of 2 hours. The dried samples are then placed directly into a desiccator and allowed to cool. After cooling, each plaque is weighed to 0.001 grams ("End Weight"). Percent coating loss is calculated using the equation: % coating loss=[(Start Weight)−(End Weight)/(Start Weight)]*100. Percent coating retained is calculated as 100%−% coating loss.

Figure 3:
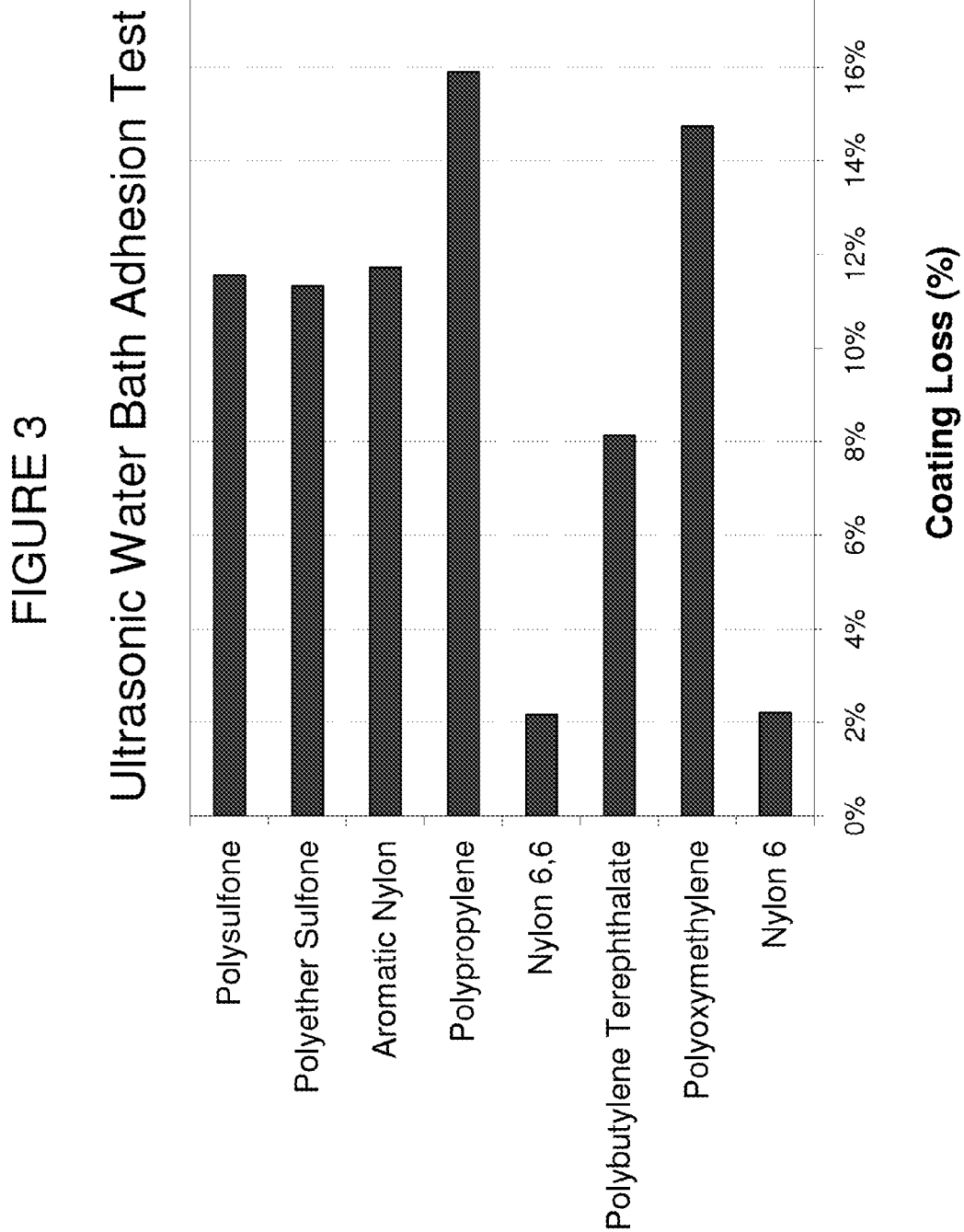
FIG. 3 is a graph of coating loss of hydrocarbon adsorbent material coated onto various types of plastic, as indicated. Coating loss was assessed by an ultrasonic water bath adhesion test.

The results are shown in FIG. 3. Of the eight types of plastic tested, only two plastics, nylon 6 and nylon 6,6, demonstrated a low coating loss (<5%) and thus good adhesion. The remaining six plastics all exhibited a coating loss of at least 8%, and five of them exhibited coating loss of greater than 10%. In particular, polypropylene, the material typically used for manufacturing air intake systems, exhibited the highest coating loss, in excess of 15%. Thus, adhesion of zeolite to polypropylene using prior art coating technology is poor.

Example 3

Effect of Nylon Modification on Adhesion

Adhesion to a series of different modified nylons was assessed using the ultrasonic water bath adhesion test to determine if adhesion can be improved by modifying the plastic.

The following plastics were tested: nylon-6 without any additives ("base resin"); nylon-6 filed with glass fibers and mineral, and pigmented black ("black"); nylon-6 filled with glass fibers and mineral ("natural"); nylon-6 molded using a mold temperature lower than standard molding temperature of about 150° F. ("cold process"); nylon-6 molded using the standard mole temperature ("standard process"); nylon-6 modified with ethylene acrylic acid sodium ionomer to alter the polarity of the nylon surface ("ionomer modified"); nylon-6 filled with glass fibers ("glass filled"); nylon-6 filed with glass fibers and mineral ("glass & mineral filled"); and nylon to which an end-capping agent was added to create a high number of amine end groups ("high amine end group").

The samples were coated as described for Example 1 with the same coating composition.

Figure 4:
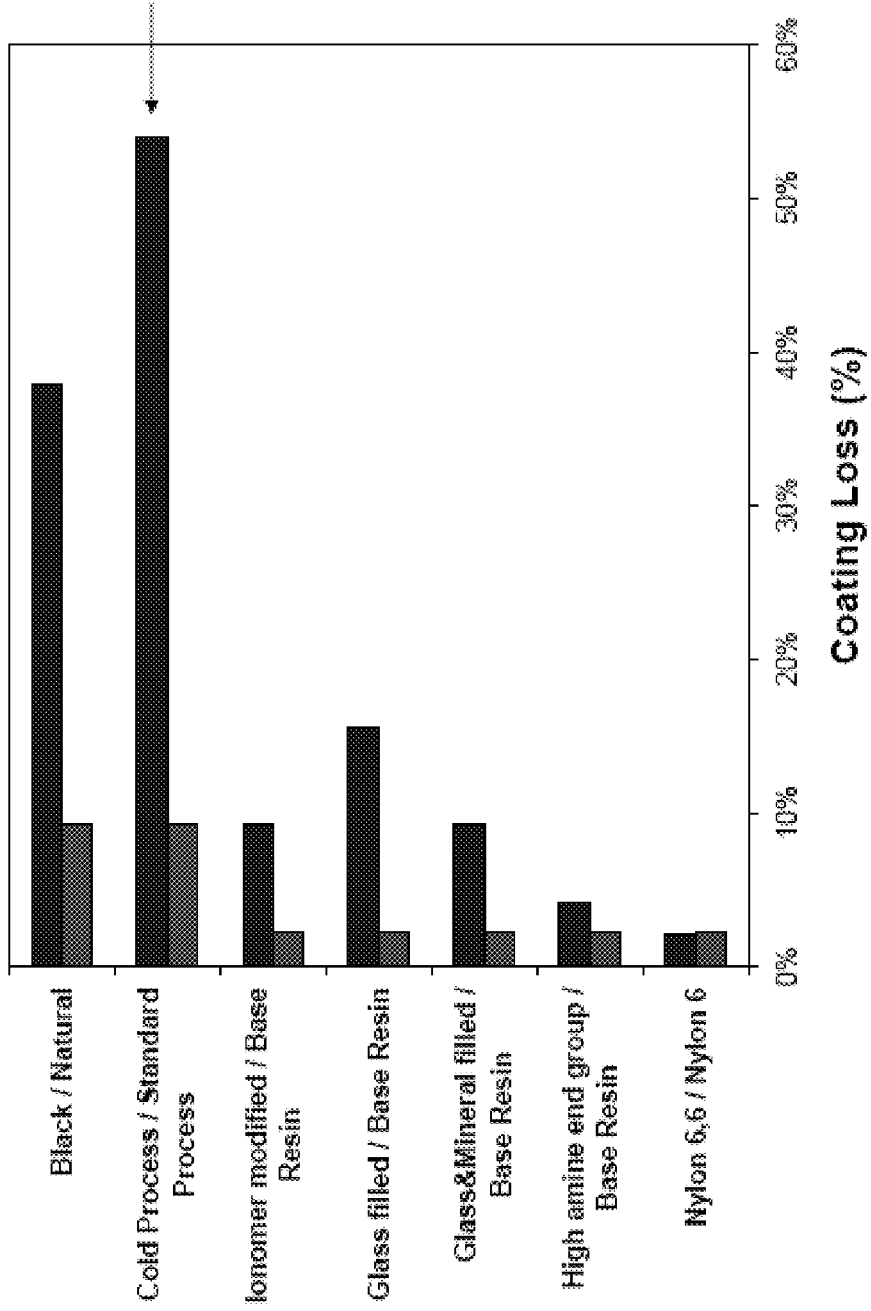
FIG. 4 is a graph of coating loss of hydrocarbon adsorbent material coated onto various types of modified nylon, as indicated. Coating loss was assessed by an ultrasonic water bath adhesion test. "Base resin" refers to nylon without any additives. The base resin is the same in the four comparisons. "Black" refers to nylon filled with glass fibers and mineral, and pigmented black. "Natural" refers to nylon filled with glass fibers and mineral. "Cold process" refers to nylon molded using a mold temperature lower than the standard temperature (of about 180° F.). "Standard process" refers to nylon molded using the standard mold temperature. "Ionomer modified" refers to nylon modified with ethylene acrylic acid sodium ionomer. "Glass filled" refers to nylon filled with glass fibers. "Glass & mineral filled" refers to nylon filled with glass fibers and mineral. "High amine end group" refers to a grade of nylon to which an end-capping agent is added to create a high number of amine end groups. The arrow indicates material in which glass fiber is enriched as surface.

The results are shown in FIG. 4. While adhesion to nylon-6 and nylon 6,6 is comparable, all of the other modifications tested increased coating loss. In particular, glass-filled and glass-and-mineral filled base resin exhibited a coating loss of at least about 10%. Cold process nylon-6, which results in glass fibers enriched at the surface of the material, exhibited an extremely high coating loss, indicative of very poor adhesion.

Thus, adhesion of zeolite to modified nylon, particularly glass-filled nylon, using prior art coating technology is poor. The modifications did not improve adhesion.

Example 4

Effect of Adhesion Promoter on Adsorbent Adhesion to Polypropylene

Chlorinated polyolefins (CPOs) and non-chlorinated polyolefins have been used to improve paint adhesion to thermoplastic polyolefin (TPO), which has replaced many metal parts on automobiles. To determine if such adhesion promoters would be efficacious for adhering adsorbent material to plastic, the following experiments were performed.

Strips of glass-and-mineral filled polypropylene were prepared and cleaned with isopropyl alcohol. Each strip was spray-coated with an adhesion promoter (5 wt % (total solids) Superchlon S-4196), then dried for 5 minutes in an oven at 110° C. The dried strips were then spray-coated with a slurry of SAL-beta zeolite and a styrene-acrylic binder. Control strips were washed with IPA and dried in the oven then prior to spray-coating with the zeolite slurry.

Adhesion was tested by three different methods: 1) tape test; 2) ultrasonic water bath; and 3) freeze/thaw test. The tape test was performed in accordance with ASTM D3359 (2008). The ultrasonic water bath adhesion was performed as described in Example 2.

The freeze/thaw adhesion test was performed as follows. The coating weight ("Start Weight") of each sample was determined as described in Example 1 for the ultrasonic water bath adhesion test. The sample was then dried in an oven at 110° C. for 1 hour. The weight of the hot sample was determined ("Initial hot sample weight"). The sample was allowed to cool to room temperature, after which the sample was submerged in water until thoroughly wet. Excess surface water was removed with an air knife by sweeping across the sample five (5) times horizontally and vertically. The air knife was connected to a 60 psig air supply. The sample weight was then recorded. The sample was placed in a freezer for 30 minutes, The sample was then removed from the freezer and allowed to warm up to room temperature (a minimum of 30 minutes). The sample was then subject to 40 kHz ultrasonic vibration in a water bath for 15 minutes. The sonicated sample was then dried in an oven at 110° C. for 2.5 hours. The dried, hot sample was then weighed ("Final hot sample weight"). The sample was subject to three more iterations, starting with the step of cooling to room temperature and then submerging in water. Afterwards, the sample is visually inspected for damage to the washcoat, such as cracks. The weight loss is calculated as a percentage of washcoat loading according to the following formula:

% coating loss (on a washcoat weight basis)={(Initial hot sample weight (g)−Final hot sample weight (g))/Start Weight (g)}*100. Percent coating retained is calculated as 100%−% coating loss.

Samples were tested in triplicate. The average of the three samples was calculated for each condition. The data on average coating loss and average coating retention are shown in Table 1.

TABLE 1 glass-and-mineral filled polypropylene

| Sample # | Adhesion promoter | Test | | Avg. Coating loss | Avg. Coating retained |
|---|---|---|---|---|---|
| C1 | Superchlon S-4196 | Tape test | No adhesion promoter | 94.1% | 5.9% |
| 1 | | | Adhesion promoter | 3.5% | 96.5% |
| C2 | Superchlon S-4196 | Ultrasonic water bath | No adhesion promoter | 8.4% | 91.6 |
| 2 | | | Adhesion promoter | 1.5% | 98.5% |
| C3 | Superchlon S-4196 | Freeze/Thaw test | No adhesion promoter | 28.6% | 71.4 |
| 3 | | | Adhesion promoter | 2.0% | 98.0% |

The data demonstrate that adhesion to polypropylene is markedly improved when the plastic surface is treated with an adhesion promoter prior to depositing the adsorbent slurry on the plastic.

Example 5

Effect of Adhesion Promoter on Adsorbent Adhesion to Nylon

Strips of nylon-6 and nylon-6 with carbon black were prepared and cleaned with isopropyl alcohol. Each strip was spray-coated with an adhesion promoter (5 wt % Advantis 510 W in water), then dried for 5 minutes in an oven at 110° C. The dried strips were then spray-coated with a slurry of SAL-beta zeolite and a styrene-acrylic binder.

Adhesion was tested by the ultrasonic adhesion test as described above. Samples were tested in triplicate.

The average coating loss and corresponding average retention data are shown in Table 2.

TABLE 2

| Sample # | Plastic | Adhesion promoter | Coating weight (mg) | Weight Loss | Avg. Coating loss | Avg. Coating Retention |
|---|---|---|---|---|---|---|
| 4 | Nylon-6 | Advantis 510W | 560.8 | 2.55% | 1.64% | 98.36% |
| | | | 744.6 | 0.59% | | |
| | | | 580.4 | 1.79% | | |
| 5 | Nylon-6 with carbon black | Advantis 510W | 738.1 | 1.77% | 1.73% | 98.27% |
| | | | 683.7 | 2.16% | | |
| | | | 736.0 | 1.26% | | |

The data demonstrate that adhesion to nylon-6 and modified nylon-6 is approximately the same when the plastic surface is treated with a nonchlorinated polyolefin adhesion promoter prior to depositing the adsorbent slurry on the plastic.

Example 6

Other Adhesion Promoters

Additional chlorinated and non-chlorinated polyolefins were tested to determine if these substances generally improve adhesion of an adsorbent material to plastic. Adhesion was tested using the Tape Test in accordance with ASTM D3359. In some instances, adhesion was also assessed using an ultrasonic water bath test.

Samples were prepared as described for Example 1 using glass- and mineral-filled polypropylene. Samples were tested in triplicate.

The data on coating loss and corresponding retention are shown in Tables 3 and 4.

TABLE 3

| | Adhesion | | Tape test | |
|---|---|---|---|---|
| | promoter | Description | Loss | Retention |
| C1 | None | — | 94.11% | 5.89% |
| 6 | BASF 867 | Solvent-borne CPO | 5.36% | 94.64% |
| 7 | BASF 934-0 | Solvent-borne CPO | 2.24% | 97.76% |
| 8 | BASF 934-30 | Solvent-borne CPO | 2.02% | 97.98% |
| 9 | Advantis 510W* | Waterborne nonchlorinated modified polyolefin | 4.23% | 95.77% |
| 10 | CP 310W | Waterborne, $NH_3$-stabilized | 3.06% | 96.94% |
| 11 | CP 347W | Waterborne, aminomethyl propanol stabilized | 4.91% | 95.09% |
| 12 | CP 349W | Waterborne, aminomethyl propanol stabilized | 4.02% | 95.98% |
| 13 | Hardlen EW-5303 | Waterborne, maleic anhydride modified | 9.71% | 90.29% |
| 14 | Hardlen EW-5313 | Waterborne, low Cl content | 6.17% | 93.83% |
| 15 | Hardlen EW-5515 | Waterborne, higher molecular weight (MW) for better cohesion | 3.60% | 96.40% |
| 16 | Hardlen EW-3015* | 2,5 furandion polymer (chlorine free) | 4.66% | 95.34% |
| 17 | Superchlon E-415 | Waterborne, 85° C. softening temp., 15% Cl, 110,000 MW | 15.95% | 84.05% |
| 1 | Superchlon S-4196 | Waterborne, 65° C. softening temp., 21% Cl, 60,000 MW | 3.46% | 96.54% |

*non-chlorinated polyolefins

These data indicate that while generally adhesion promoters improve adhesion to filled polypropylene, the degree of improvement varies a lot. In particular, of the thirteen different adhesion promoters tested, only nine (BASF 867, BASF 934-0, BASF 934-30, CP 310 W, CP 347 W, CP 349 W, Hardlen EW-5515, Hardlen EW-3015 and Superchlon S-4196) provided a coating retention of at least 95% by the tape test. Of these nine, seven are CPOs and two are nonchlorinated adhesion promoters.

Ultrasonic water bath adhesion was assessed for four of the nine adhesion promoter yielding at least 95% coating retention by the tape test. The results are shown in Table 4. The four adhesion promoters provided similarly greatly improved adhesion.

TABLE 4

| | Adhesion | | Ultrasonic water bath | |
|---|---|---|---|---|
| Sample # | promoter | Description | Loss | Retention |
| C2 | None | — | 8.35% | 91.65% |
| 18 | BASF 934-30 | Solvent-borne CPO | 1.29% | 98.71% |
| 19 | CP 310W | Waterborne, $NH_3$-stabilized | 2.18% | 97.82% |
| 20 | Hardlen EW-5515 | Waterborne, higher molecular weight (MW) for better cohesion | 1.10% | 98.9% |
| 2 | Superchlon S-4196 | Waterborne, 65° softening temp., 21% Cl, 60,000 MW | 1.46% | 98.54% |

Example 7

Adhesion of Hydrocarbon Adsorbent Comprising Molecular Sieve and Activated Carbon To determine if mixtures of hydrocarbon adsorbents can be adhered to plastic, the following experiments were performed.

Strips of glass-and-mineral filled polypropylene were prepared and cleaned with isopropyl alcohol. The cleaned strips were then spray-coated with one of three coatings: 1) a slurry of 100% SAL-beta zeolite and a styrene-acrylic binder; 2) a mixture of 75% SAL-beta zeolite and 25% activated carbon; and 3) a slurry of 100% activated carbon.

The coating composition of 100% SAL-beta zeolite and a styrene-acrylic binder was: SAL-beta zeolite (92.5%, based on total dry solids), Rhoplex-P-376 styrene-acrylic binder (7.4%), Kelzan CC xantham gum thickener (0.1%). The coating was applied to the strips as an aqueous slurry (50% solids in water, pH 6) with a spray gun and the coated strips dried at 110° C. for 30 minutes.

The coating composition of the mixture of 75% SAL-beta zeolite and 25% activated carbon was: SAL-beta zeolite (69.4%, based on total dry solids), activated carbon (CN 5-20; 20.4%), Rhoplex-P-376 styrene-acrylic binder (7.2%), Kelzan CC xantham gum thickener (0.1%), Tamol 165A polymeric dispersant (1.0%), and Rhodaline 999 polymeric defoamer (1.9%). The coating was applied as an aqueous slurry (38% solids in water, pH 6) with a spray gun and the coated samples dried at 110° C. for 30 minutes.

The coating composition of the 100% activated carbon slurry was: activated carbon (CN5-20; 81.6%, based on total dry solids), Rhoplex-P-376 styrene-acrylic binder (6.5%), Kelzan CC xantham gum thickener (0.1%), Tamol 165A polymeric dispersant (4.1%), and Rhodaline 999 polymeric defoamer (7.7%). The coating was applied as an aqueous slurry (22% solids in water, pH=6) with a spray gun and the coated samples dried at 110° C. for 30 minutes.

Strips were prepared in triplicate.

Adhesion was tested the ultrasonic water bath test as described above. The results are shown in Table 5. These data indicate that excellent adhesion can be obtained for a mixture of zeolite and activated carbon.

TABLE 5

| Sample # | Coating | Ultrasonic water bath | |
|---|---|---|---|
| | | Loss | Retention |
| 22 | 100% SAL-beta zeolite (195 mg/in²) | 0.5% | 99.5% |
| 23 | 75% SAL-beta zeolite and 25% CN5-20 (77 mg/in²) | 1.6% | 98.4% |
| 24 | 100% CN5-20 (20 mg/in²) | 49.0% | 51.0% |

These data indicate that a mixture of hydrocarbon adsorbents, in this case a mixture of zeolite and activated carbon, can been adhered to plastic. While the coating retention of a 3:1 mixture of zeolite to carbon (Sample 22) was greater than 95% in this experiment, this result was not reproduced in subsequent experiments, indicating that an adhesion promoter is needed for good adhesion of mixtures of hydrocarbon adsorbents.

Adhesion of the mixture of zeolite and activated carbon (75% SAL-beta zeolite and 25% CN5-20) to glass-and-mineral filled polypropylene as a single coat and as a double was also tested using the freeze-thaw ultrasonic adhesion test as described in Example 4. The first coat was applied as an aqueous slurry (38% solids in water, pH 6) with a spray gun, and the coated sample was dried at 110° C. for 30 minutes. For the double coated sample, a second coat of the same slurry was then applied with a spray gun to the same coated side of the sample, and the sample was dried at 110° C. for another 30 minutes.

TABLE 6

| Sample # | Coating | Freeze-thaw ultrasonic adhesion bath | |
|---|---|---|---|
| | | Loss | Retention |
| 25 | Single coated (51 mg/in) | 11.9% | 88.1% |
| 26 | Double coated (146 mg/in²) | 3.5% | 96.5% |

These data demonstrate that the double-coated sample has excellent coating adhesion as measured by the freeze-thaw ultrasonic adhesion test. These data indicate that the adhesion between the second applied layer of adsorbent coating and the first layer is good.

Example 8

Characterization of Adhesion Promoters

Commercially-available CPOs were characterized % chlorine in the total solids. Chlorine content of chlorinated polyolefins was measured using the Oxygen Flask Combustion method followed by Argentiometric determination (titration by silver nitrate) of the chloride produced.

The data for the CPOs is shown in Table 7.

TABLE 7

| CPO | Cl (% in the total solids) | Literature description |
|---|---|---|
| S-4196 | 13.35% | Waterborne |
| EW-5515 | 11.37% | Waterborne |
| CP 310W | 16.95% | Waterborne, NH₃-stabilized |

TABLE 7-continued

| CPO | Cl (% in the total solids) | Literature description |
|---|---|---|
| CP 349W | 14.95% | Waterborne, aminomethyl propanol stabilized |
| CP 347W | 14.88% | Waterborne, aminomethyl propanol stabilized |
| EW-5313 | 10.44% | Waterborne, maleic anhydride modified |
| EW-5303 | 14.80% | Waterborne |
| E-415 | 10.77% | Waterborne |

CPOs can also characterized regarding molecular weight and glass transition temperature of the CPO portion of the commercially-available emulsion.

Molecular weight data can be obtained using size exclusion chromatography. The molecular weight results can be from duplicate injections and can be determined relative to polystyrene standards. Mn is the number average molecular weight and Mw is the weight average molecular weight. The ratio of Mw to Mn is a measure of polydispersity.

The glass transition temperature (Tg) can measured using differential scanning calorimetry (DSC). An initial heating step can remove any thermal history associated with sample preparation.

Example 9

Single Step Application of Activated Carbon Adsorbent

To determine if hydrocarbon adsorbents can be adhered to plastic in a single coat, the following experiment was performed.

Plaques of polypropylene were prepared and cleaned with isopropyl alcohol. The cleaned plaques were then coated with one of two coatings. The composition of the first coating (Sample #27) was Norit CN520 activated carbon (68.9%, based on total dry solids), Rhoplex NW-1715K styrene-acrylic binder (20.7%), Advantis 510 W adhesion promoter (6.9%), and Avanel S74 surfactant (3.4%). The composition of the second coating (Sample #28) was Norit CN520 activated carbon (66.7%, based on total dry solids), Rhoplex NW-1715K styrene-acrylic binder (20.0%), Advantis 510 W adhesion promoter (6.7%), and Rhodocal DS4 surfactant (6.7%). The coatings were applied to the polypropylene plaques as an aqueous slurry (18.6% solids in water, pH 9) and dried at 110° C. for 30 minutes. Plaques were prepared in triplicate. Adhesion was tested using the ultrasonic water bath test as described above.

The results are shown in Table 8. These data indicate that a high level of adhesion can be obtained by including an adhesion promoter in the adsorbent composition, and applying it to a plastic surface that is untreated with an adhesion promoter prior to applying the particulate composition.

TABLE 8

| Sample # | Coating | Ultrasonic water bath | |
|---|---|---|---|
| | | Loss | Retention |
| 27 | 1$^{st}$ | 7.40% | 92.60% |
| 28 | 2$^{nd}$ | 4.81% | 95.19% |

Example 10

Binder Tg and Deformation Resistance

To determine the effect that the Tg of the binder has on the coating, the following experiment was performed.

Plaques of glass and mineral filled polypropylene were prepared and cleaned with isopropyl alcohol. Each plaque was spray-coated with an adhesion promoter (Superchlon S4196, 5% in water), then dried for 5 minutes in an oven at 110° C. The plaques were then coated with one of three compositions, each having a different binder. The composition of the coatings was SAL-beta zeolite (64.6%, based on total solids), Norit CN520 activated carbon (20.5%), a binder (13.8%), Avanel S74 surfactant (1.0%) and Kelzan CC thickener (0.09%). The three different binders tested were Rhoplex WL-51 (Sample #29), Rhoplex P-376 (Sample #30), and Rhoplex NW-1715K (Sample #31). The manufacturer's reported glass transition temperatures (Tg) of these binders are shown in Table 9. The compositions were applied to the polypropylene plaques as an aqueous slurry (20% solids in water, pH 9) and dried at 110° C. for 30 minutes. Plaques were prepared in triplicate.

The three different samples were tested using an impact tester according to ASTM D2794, a standard method for determining the resistance of coatings to the effects of rapid deformation (impact) by a falling weight, either as an intrusion or an extrusion. In brief, the falling distance is gradually increased until the coating mechanically fails. For this experiment, failure was defined as being when some of the coating first came loose off the plaque. The plaques were subjected to the intrusion iteration of the impact test.

The results are shown in Table 9. These data indicate that the resistance to rapid deformation increases with lower Tg.

TABLE 9

| Sample # | Binder | Binder Tg (° C.) | Point of Failure |
|---|---|---|---|
| 29 | Rhoplex WL-51 | 57 | 10 kg-cm |
| 30 | Rhoplex P-376 | 19 | 35 kg-cm |
| 31 | Rhoplex NW-1715K | −6 | 48 kg-cm |

While the methods and components are susceptible to various modifications and alternative forms, specific embodiments thereof have been described herein in detail. It should be understood, however, that it is not intended to limit the methods and components to the particular form disclosed, but on the contrary, the intention is to cover all modifications, equivalents and alternatives falling within the spirit and scope of the methods and components described here.

The disclosures of each and every patent, patent application and publication cited herein are hereby incorporated herein by reference in their entirety.

What is claimed is:

1. An adsorbent and/or catalytic article, said article comprising
at least one plastic surface and an adhered material on at least a portion of said plastic surface, wherein said adhered material comprises an adherent,
an organic binder and
a particulate material selected from the group consisting of an adsorbent material, a catalytic material and combinations thereof,
wherein said adherent is an adhesion promoter,
wherein said adhesion promoter is a chlorinated polyolefin or a maleated polyolefin, and
wherein said plastic is selected from the group consisting of polypropylene, nylon-6, nylon-6,6, aromatic nylon, polysulfone, polyether sulfone, polybutylene terephthalate, polyphthalamide, polyoxymethylene, polycarbonate, polyvinylchloride, polyester, and polyurethane.

2. The article of claim 1, wherein the particulate material is an adsorbent material.

3. The article of claim 1, wherein said article is an air intake system component, said component comprising a substantially hollow interior chamber, said chamber having an inner surface and an outer surface, wherein said inner surface is plastic and a portion of said inner surface comprises said adhered material.

4. The article of claim 3, wherein said component is selected from the group consisting of an air intake duct, an air cleaner housing, an air duct, and an air intake manifold.

5. The article of claim 3, wherein said plastic is selected from the group consisting of glass-filled polypropylene, mineral-filled polypropylene, glass-and-mineral-filled polypropylene, glass-filled nylon-6, mineral-filled nylon-6, and glass-and-mineral-filled nylon-6.

6. The article of claim 3, wherein aid organic binder comprises a styrene/acrylic copolymer.

7. The article of claim 3, wherein said organic binder has a low glass transition temperature (Tg).

8. The article of claim 1, wherein said article is a patch comprising a plastic outward surface and an inward surface, wherein said outward surface comprises said adhered material.

9. An air intake system comprising at least one air intake system component of claim 3.

10. A method for adhering a particulate material to a plastic surface, said method comprising
treating a plastic surface with an adherent to form a treated plastic surface, and
depositing a composition comprising an organic binder and a particulate material on said treated plastic surface to form a coated plastic surface having improved adhesion of said particulate material to said plastic surface, wherein:
said adherent is an adhesion promoter
said adhesion promoter is a chlorinated polyolefin or a maleated polyolefin,
said particulate material is selected from the group consisting of an adsorbent material, a catalytic material and combinations thereof, and
said plastic is selected from the group consisting of polypropylene, nylon-6, nylon-6,6, aromatic nylon, polysulfone, polyether sulfone, polybutylene terephthalate, polyphthalamide, polyoxymethylene, polycarbonate, polyvinylchloride, polyester, and polyurethane.

11. The method of claim 10, wherein said treating step is applying the adhesion promoter.

12. The method of claim 10, wherein said coated plastic surface having improved adhesion has a coating retention of at least about 95% as measure by tape test.

13. The method of claim 10, wherein said coated plastic surface having improved adhesion has adhesion improved by at least about 5% relative to a coated plastic surface in the absence of said adherent.

14. The method claim 10, wherein said particulate material is an adsorbent material.

15. A method for adhering a particulate material to a plastic surface, said method comprising
depositing a composition comprising an organic binder, an adhesion promoter and a particulate material on a plastic surface to form a coated plastic surface having improved adhesion of said particulate material to said plastic surface, wherein:

said particulate material is selected from the group consisting of an adsorbent material, a catalytic material and combination thereof, said plastic is selected from the group consisting of polypropylene, nylon-6, nylon-6,6, aromatic nylon, polysulfone, polyether sulfone, polybutylene terephthalate, polyphthalamide, polyoxymethylene, polycarbonate, polyvinylchloride, polyester, and polyurethane, and said adhesion promoter is a chlorinated polyolefin or a maleated polyolefin.

16. A method for adhering a particulate material to a molded plastic article, said method comprising applying an adhesion promoter to an inner surface of a mold cavity, introducing plastic into the mold cavity to form a treated molded plastic article, and removing said treated molded plastic article from said mold cavity, wherein a composition comprising an organic binder and a particulate material is adhered to said treated molded plastic article by:

i) depositing said composition on said adhesion promoter-treated inner surface of said mold cavity prior to said introducing step;

ii) depositing said composition on said treated molded plastic article after said removing step; or iii) combining said composition with said adhesion promoter and then applying to the inner surface of a mold cavity;

thereby forming a coated molded plastic article having improved adhesion of said particulate material to said molded plastic article, wherein:

said particulate material is selected from the group consisting of an adsorbent material, a catalytic material and combinations thereof, and said plastic is selected from the group consisting of polypropylene, nylon-6, nylon-6,6, aromatic nylon, polysulfone, polyether sulfone, polybutylene terephthalate, polyphthalamide, polyoxymethylene, polycarbonate, polyvinylchloride, polyester, and polyurethane.

17. The method of claim 16, wherein said adhesion promoter is a chlorinated polyolefin or a maleated polyolefin.

18. The method of claim 16, wherein the particulate material is an adsorbent material.

19. The article of claim 1, wherein said article is a component of an evaporative emissions control system.

20. The article of claim 19, wherein the component is part of an evaporative emissions canister or is part of a hydrocarbon scrubber.

21. The article of claim 20, wherein the component is a plastic substrate coated with the particulate matter.

22. The molded plastic article made by the process of claim 16.

* * * * *